United States Patent
Shibaguchi

Patent Number: 5,272,561
Date of Patent: Dec. 21, 1993

[54] ELECTROOPTIC DEVICE

[75] Inventor: Takashi Shibaguchi, Yokohama, Japan

[73] Assignee: Ricoh Company, Ltd., Tokyo, Japan

[21] Appl. No.: 15,893

[22] Filed: Feb. 10, 1993

Related U.S. Application Data

[60] Continuation of Ser. No. 877,320, May 1, 1992, abandoned, which is a division of Ser. No. 468,873, Jan. 23, 1990, Pat. No. 5,140,454.

[30] Foreign Application Priority Data

Jan. 24, 1989 [JP] Japan ................................. 1-14798
Feb. 23, 1989 [JP] Japan ................................. 1-43893
Mar. 15, 1989 [JP] Japan ................................. 1-63346

[51] Int. Cl.$^5$ ................................................. G02F 1/29
[52] U.S. Cl. ................................. 359/254; 359/301; 359/319
[58] Field of Search ............... 359/254, 295, 301, 302, 359/303, 304, 323, 319; 369/44.23

[56] References Cited

U.S. PATENT DOCUMENTS

| | | | |
|---|---|---|---|
| 2,163,551 | 6/1939 | Clothier et al. | 359/254 |
| 3,402,001 | 9/1968 | Fleisher | 350/379 |
| 3,575,487 | 4/1971 | Ohm et al. | 359/254 |
| 3,653,742 | 4/1972 | Buchan | 359/254 |
| 4,108,622 | 8/1978 | Martin | 350/379 |
| 4,124,273 | 11/1978 | Huignard et al. | 369/44.23 |
| 4,466,703 | 8/1984 | Nishimoto | 359/254 |
| 4,576,441 | 3/1986 | Kubick | 350/355 |
| 4,614,408 | 9/1986 | Mir et al. | 359/254 |
| 5,020,885 | 6/1991 | Shibaguchi | 350/355 |
| 5,099,355 | 3/1992 | Tomita | 359/254 |
| 5,140,454 | 8/1992 | Shibaguchi | 359/254 |

FOREIGN PATENT DOCUMENTS

| | | | |
|---|---|---|---|
| 2649073 | 5/1977 | Fed. Rep. of Germany | 350/359 |
| 611167 | 5/1978 | U.S.S.R. | 359/254 |

Primary Examiner—Martin Lerner
Attorney, Agent, or Firm—Oblon, Spivak, McClelland, Maier & Neustadt

[57] ABSTRACT

An electrooptic device which comprises an electrooptic material disposed on an optical axis of an optical beam. The beam is linearly polarized in advance. The electrooptic material has opposed two surfaces in parallel with the optical axis and in both sides of the optical axis. A first electrode pair which is composed of electrode films is formed on the two surfaces of the electrooptic material to perform a lens function. And a second electrode pair which is composed of electrode films is formed on the two surfaces of the electrooptic material to perform a deflection function. The first and the second pairs are disposed side by side with each other along the optical axis.

5 Claims, 18 Drawing Sheets

ELECTROOPTIC DEVICE

This application is a continuation of application Ser. No. 07/877,320, filed on May 1, 1992, now abandoned, and a division of Ser. No.: 07/468,873, filed on Jan. 23, 1990, is now abandoned.

BACKGROUND OF THE INVENTION

1. Field of the Invention

The present invention relates to an electrooptic device which is applicable to various optical information processing devices such as an optical reading/writing device etc.

Also, more particularly, the present invention relates to an electrooptic lens which is used in an optical device such as an optical head of an optical information reading/writing apparatus.

2. Description of the Related Art

An electrooptic crystal is one of the important materials used in an optical device. An example of the usage of the electrooptic crystal is disclosed in the electromagnetic field theory research report of the Electric Society, 1985 (EMT-85, No. 16–20, P25–33). The report discloses a theoretical analysis of an electrooptic crystal arrangement wherein a minute distributed index type micro lens plate less than 250 $\mu$m is formed on a crystal plate of $LiNbO_3$ by a proton exchange method and an electrode is formed thereon wherein a voltage is applied to the electrode so as to change the focal length of the lens by changing the refractive index thereof due to the electrooptic effect.

Also, a document "Total internal reflection lens" of "APPLIED OPTICS/Vol. 24, No. 9/1, May 1985" discloses a total reflection lens using an electrooptic crystal of $LiTaO_3$. The document discloses an arrangement wherein a minute electrode array is formed on an X crystal face or Z face of an electrooptic crystal of $LiTaO_3$ and wherein a beam waist position of a laser beam is changed in such a way that a convergent incident laser beam is irradiated on the X or Z face of the crystal at an incident angle of 1.4° with a beam diameter of about 20 $\mu$m and that a voltage is applied to the electrode array so as to change the refractive index of the crystal lens due to the electrooptic effect whereby the position of the beam waist of the incident laser beam is shifted.

However, with respect to the former arrangement wherein a minute distributed index micro lens plate is formed on the electrooptic crystal of $LiNbO_3$ by the proton exchanging method, there are some disadvantages as follows.

First, it is not easy to manufacture the lens in accordance with such an arrangement.

Second, the incident beam diameter has to be less than 250 $\mu$m which limits the applicable optical devices.

Third, theoretically, the focal position is shiftable only within a range of 200 $\mu$m.

Fourth, the convergent characteristic of the lens arrangement is unclear in practical use thereof since the arrangement is analyzed only by the theoretical calculation as yet.

Fifth, the arrangement does not have a deflection function.

Also, the latter arrangement of the total reflection lens using the electrooptic crystal of $LiTaO_3$ has the following disadvantages.

First, the incident laser beam has to be arranged substantially in parallel (1.4°) with the crystal face (reflection surface).

Second, the incident beam has to be converged so that the diameter thereof on the reflection surface becomes less than a predetermined value, for example 20 $\mu$m. Therefore, it becomes necessary to prepare a special condenser lens system for condensing the beam, which bulks and complicates the optical device structure.

Third, the arrangement does not have a deflection function.

In order to cope with some of the above-mentioned disadvantages, an electrooptic lens is proposed which is arranged in such a way that a voltage is applied to a pair of electrodes having an electrooptic material such as PLZT disposed therebetween so that a refractive index distribution is generated in the material due to the electrooptic effect so that the electrooptic material functions as a lens. Such an electrooptic lens has a relatively simple structure and can be manufactured easily. Also, the incident beam condition required for the above-mentioned electrooptic lens is not so strict. However, the electrooptic lens does not have a function of deflection.

In other words, there has not been an electrooptic device having a deflection function as well as a lens function.

Of course, it is possible to combine an optical deflector with a variable-focal-length lens using the electrooptic crystal as disclosed in the above-mentioned documents. However, in accordance with such a combination arrangement, it is necessary to prepare an individual lens and an individual deflector. Thus, it has not been realized an optical device having a lens function and a deflection function which device is formed as one unit formed from one body.

Also, the electrooptic lens mentioned above is applicable only to a beam having a special sectional shape, which impairs the matching characteristic thereof with the optical deflector to be combined with.

The convergent characteristic of the electrooptic lens mentioned above is also insufficient so that aberration is generated in the image through the lens.

SUMMARY OF THE INVENTION

It is therefore an object of the present invention to provide an electrooptic device having a lens function and a deflection function as well without preparing an individual variable-focal-length lens and an individual optical deflector but being formed as one unit made from one body and which electrooptic device has a satisfactory matching characteristic with the optical deflector to be combined with.

Another object of the present invention is to provide an electrooptic device comprising an electrooptic lens which minimizes the generation of aberration.

Still another object of the present invention is to provide an electrooptic device comprising an electrooptic lens which has a simple structure and can be easily manufactured.

The object of the invention can be achieved by an electrooptic device comprising: an electrooptic material disposed on an optical path of an optical beam which is linearly polarized, the material having opposed two surfaces on both sides of the beam penetrating therethrough; at least a first pair of electrodes disposed on the opposed both surfaces of the electrooptic material along the beam penetrating the material, each electrode having a shape and a size so that the material functions as a lens by applying a voltage thereto; a first power source to supply the voltage to the first pair of electrodes; a second pair of electrodes disposed on the opposed both surfaces of the electrooptic material along the beam, each electrode having a shape and a size so that the material functions to deflect the beam by applying a voltage thereto; and a second power source to supply the voltage to the second pair of electrodes.

The electrooptic device having the above-mentioned structure functions as follows.

When a predetermined voltage is applied to the first pair of electrodes from the first power source, a refractive index distribution is generated in the electrooptic material due to the quadratic electrooptic effect (Kerr-effect). The electrooptic material functions as a lens to converge or diverge the beam in accordance with the shape and the size of the first pair of electrodes. Therefore, the linearly polarized incident beam is converged or diverged by the lens function of the electrooptic material when penetrating therethrough. The condition required to the incident beam is only that the beam has to be linearly polarized. Other than this limitation regarding the polarization of the beam, there is no limitation of the condition under which the device is used. Therefore, the device is applicable to a linearly polarized optical beam under any condition without regarding, for example, the incident angle of the beam and the diameter thereof.

Also, the focal point of the lens can be controlled by the voltage applied to the first pair of electrodes.

On the other hand, when a predetermined voltage is applied to the second pair of electrodes from the second power source, a refractive index change is generated in the electrooptic material due to the quadratic electrooptic effect so that the material functions to deflect the optical beam in accordance with the shape and the size of the second pair of electrodes. Therefore, the optical beam is deflected by the function of the electrooptic material when passing therethrough.

The deflection angle can be controlled by the voltage applied to the second pair of electrodes.

Accordingly, by adjusting the voltage applied to the first pair of electrodes and the second pair of electrodes, respectively, it becomes possible to control the focal point and the deflection angle, independently.

Also, the electrooptic device having the structure mentioned above can be easily manufactured since the device is formed from one body of the electrooptic material on which the first and the second pairs of electrodes are arranged.

Advantages of the above-mentioned electrooptic device are that the device is constituted as a structure of one body and has the lens function and the deflection function as well, which enable widening the applicable field of the device, so that it becomes possible to control the focal point and the deflection angle, independently, by adjusting the voltage applied to the first and the second pairs of electrodes, respectively, and that the device can be easily manufactured by forming the first and the second pairs of electrodes on the same electrooptic material.

Another object of the present invention can be achieved by an electrooptic device comprising an electrooptic lens system which comprises: a first lens for converging a linearly polarlized optical beam in a first direction; a second lens for converging the beam in the first direction; an electrooptic material disposed between the first and the second lenses on an optical path of the beam at a position of beam waist thereof, the material having opposed two surfaces on both sides of the beam penetrating therethrough; a pair of electrodes disposed on the opposed two surfaces and having a shape and a size so that the material has a lens function in a second direction perpendicular to the first direction by applying a voltage thereto; and a power source to supply the voltage to the pair of electrodes.

Also, in accordance with a variant of the above-mentioned structure of the invention, in addition to the first lens, the first electrooptic lens and the second lens mentioned above, there is provided a third lens for converging the beam output from the second lens in a second direction; a fourth lens for converging the beam in the second direction; an electrooptic material disposed between the third lens and the fourth lens on an optical path of the beam at a position of beam waist of the beam output from the third lens, the material having opposed two surfaces on both sides of the beam; a second pair of electrodes disposed on the opposed two surfaces of the material and having a shape and a size so that the material has a lens function to the beam in a first direction by applying a voltage to the material; and a second power source to supply the voltage to the material, a second electrooptic lens being constituted from the electrooptic material between the third and fourth lenses, the second pair of electrodes and the second power source.

The electrooptic device having the structure mentioned above functions as follows.

When a predetermined voltage is applied to the pair of electrodes from the power source, a refractive index distribution is generated in the electrooptic material due to the quadratic electrooptic effect. Each of the electrodes has a shape and a size so that the material functions to converge or diverge the beam in a predetermined second direction. The incident beam which is linearly polarized is converged or diverged in the second direction in accordance with the shape and the size of the electrode. The device is applicable to an incident beam under any condition if the beam is linearly polarized. The optical beam output from the device has a very small aberration since the beam is converged in a first direction perpendicular to the second direction prior to entering into the electrooptic material. That is, the beam is transmitted through the region of the electrooptic material, in which refractive index is parabolic, thus minimizing the generation of aberration.

After that, the beam is converged in the first direction by the second lens so that the beam is output from the lens as a convergent or a divergent beam having a very small aberration.

The focal point of the beam in the first direction can be controlled by changing the voltage applied to the pair of electrodes from the power source.

Also, in accordance with the variant of the present invention structure mentioned above, a second lens system comprising a third lens, a second electrooptic lens and a fourth lens is arranged in addition to the first lens system comprising the first lens, the first electrooptic lens and the second lens. The arrangement of the first and the second directions with respect to the second lens system is reversed from that with respect to the first lens system. Therefore, the aberration can be minimized in both directions.

Advantages of the above-mentioned structure of the present invention are that the lens function in a desired direction can be obtained by using an electrooptic material, a pair of electrodes and a power source, which makes it possible to simplify the structure of the device and easily manufacture the device, that the focal point can be easily controlled by adjusting the voltage of the power source, that the condition under which the device is applicable is moderated so that the only limitation is that the beam has to be linearly polarized in advance and that the aberration is minimized since the incident beam is flattened by the first lens in the direction perpendicular to the lens functional direction of the electrooptic lens so that the beam is propagated through the region of the parabolic refractive index distinction when passing through the electrooptic lens.

Also, advantages of the above-mentioned variant of the invention are that the aberration is minimized in both of the first and the second directions and that the focal point and the beam shape can be controlled by adjusting the voltage applied to the pairs of electrodes.

Another object of the invention can be achieved by an electrooptic device comprising: an electrooptic material disposed on an optical path of a linearly polarized beam, the material having opposed two surfaces on both sides of the beam penetrating therethrough; a first pair of electrodes disposed on the two surfaces of the electrooptic material and having a shape and a size which make the material function as a lens in a first direction by applying a voltage thereto; a second pair of electrodes disposed on the two surfaces of the electrooptic material along with the first pair of electrodes along the optical path of the beam, the electrodes of the second pair having a shape and a size which make the material function as a lens in a second direction perpendicular to the first direction by applying a voltage thereto; a first power source to supply the voltage to the first pair of electrodes; and a second power source to supply the voltage to the second pair of electrodes.

A variant of the invention comprises a pair of electrodes which have a shape and a size which make the pair of electrodes function as both of the first pair and the second pair of electrodes.

Also, another variant of the invention comprises third and fourth pair of electrodes in addition to the first and the second pairs of electrodes disposed on the opposed two surfaces of the electrooptic material along the optical path of the beam; the third pair of electrodes having a shape and a size which make the material function as a lens in the second direction perpendicular to the first lens functional direction of the first pair of electrodes by applying a voltage thereto; the fourth pair of electrodes having a shape and a size which make the material correct aberration of the beam generated by the lens function of the third pair of electrodes by applying a voltage; and third and fourth power sources being provided for supplying the voltage to the third and the fourth pairs of electrodes, respectively.

The above-mentioned structure of the invention functions as follows.

When a predetermined voltage is applied to the first pair of electrodes from the first power source, a refractive index distribution is generated in the material due to the quadratic electrooptic effect. The electrooptic material functions as a lens in accordance with the shape and the size of the first pair of electrodes so that the beam is converged or diverged in one direction. In this case, the incident beam is linearly polarized in advance. Any optical beam can be used under any condition if the incident beam is linearly polarized.

The optical beam operated on by the first pair of electrodes does not have a large spherical aberration because of the arrangement of the second pair of electrodes. That is, the electrodes of the second pair of electrodes have a shape and a size which cause a refractive index distribution in the electrooptic material so as to correct the aberration of the beam generated by the lens function of the first pair of electrodes. Accordingly, it becomes possible to minimize the aberration generated in the beam after passing through the device.

In accordance with a variant of the structure of the present invention mentioned above, by properly arranging the shape and the size of each of the first and second pairs of electrodes, it becomes possible to constitute the first and the second pairs of electrodes from one pair of electrodes whereby the structure is simplified and the convergent characteristic of the device is upgraded so that the aberration of the beam is further minimized.

Also, in accordance with another variant of the structure of the invention mentioned above, there is provided a third pair of electrodes which functions to generate a refractive index distribution in the electrooptic crystal material so that the material functions as a lens in a second direction perpendicular to the first direction of the lens function by the first pair of electrodes. Also, a fourth pair of electrodes is provided along with the third pair of electrodes so as to correct aberration generated by the lens function of the third pair of electrodes. Therefore, the beam undergoes the lens function and the aberration correcting function by the third and the fourth pairs of electrodes in the direction perpendicular to the lens functional direction of the first pair of electrodes. Accordingly, the beam is converged or diverged after passing through the device in the state wherein the aberration of the beam is minimized in both of the two directions perpendicular to each other.

Advantages of the above-mentioned electrooptic device are that an optical beam can be well converged in a state wherein the aberration is minimized, that the structure is simplified and easily manufactured and that the device is applicable to any optical beam under any condition if the incident beam is linearly polarized.

Advantages of the above-mentioned variant of the present invention are that the first and the second pairs of electrodes can be formed from one common pair of electrodes by properly adjusting and arranging the shape and the size of the first and the second pairs of electrodes, which makes it possible to realize a further compact electrooptic device which has a superior convergent characteristic and minimizes the aberration generated in the beam.

Advantages of the above-mentioned another variant of the present invention are that first the beam undergoes the lens function and the aberration correcting function by the first and the second pairs of electrodes in a first direction and after that the beam undergoes the lens function and the aberration correcting function in a second direction perpendicular to the first direction by the third and the fourth pairs of electrodes, thus the aberration can be minimized in the two directions perpendicular to each other.

Further objects and advantages of the present invention will be apparent from the following description of the preferred embodiments of the invention as illustrated in the accompanying drawings.

BRIEF DESCRIPTION OF THE DRAWINGS

FIG. 1b is a side view of the optical system of FIG. 1a;

FIG. 3b is a side view of the optical system of FIG. 3a;

FIG. 4b is a side view of the optical system of FIG. 4a;

FIG. 5b is a side view of the optical system of FIG. 5a;

FIG. 6b is a side view of the optical system of FIG. 6a;

FIG. 8b is an explanatory view of the electrooptic material for explaining the positions of the lines of the graph of FIG. 8a;

FIG. 11b is a plan view of the optical system of FIG. 11a;

FIG. 13b is an explanatory view for explaining the positions corresponding to the lines of characteristic curve of FIG. 13a;

FIG. 16b is a plan view of the optical system of FIG. 16a;

DESCRIPTION OF THE PREFERRED EMBODIMENTS

A first embodiment of the present invention is described hereinafter with reference to FIGS. 1a, 1b and 2.

Figure 1A:
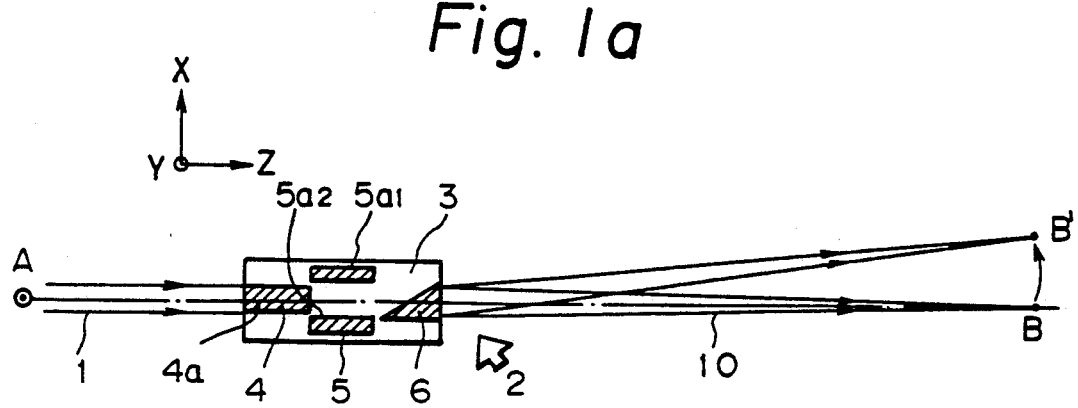
FIG. 1a is a plan view if an optical system in accordance with an embodiment of the present invention.
Figure 1B:
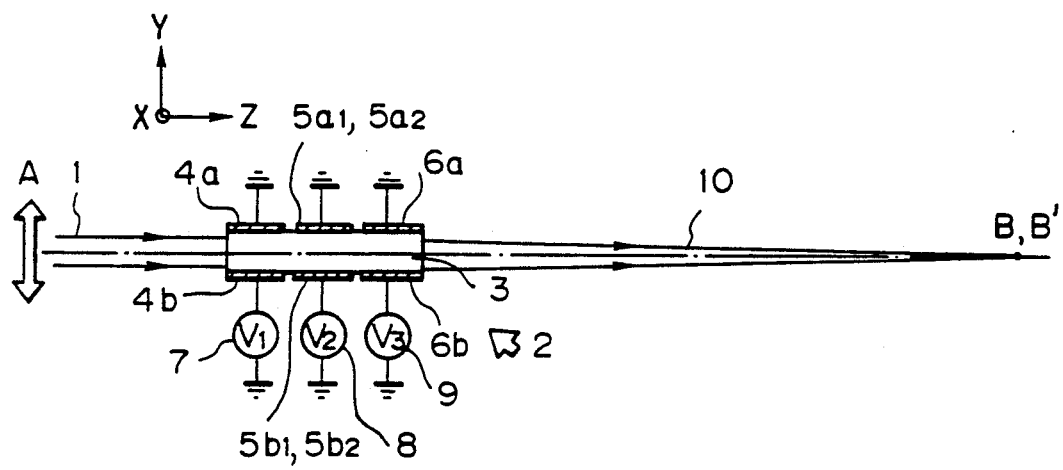

An optical beam 1 is linearly polarized in advance as represented by a double-head arrow A (FIG. 1b). An electrooptic device 2 in accordance with the present invention is disposed on an optical path of the linearly polarized beam 1, which path is parallel with the axis Z. The device 2 comprises a rectangular box shaped electrooptic material 3 made from, for example, an electrooptic crystal of PLZT. The composition of the PLZT is preferably 9.0/65/35. However, the composition is not limited to this ratio.

The material 3 has a side surface through which the beam 1 is introduced to the material. This side of the material 3 is referred to as an input side hereinafter. Also, the material 3 has a side surface through which the beam 1 is output from the material 3 in the side opposite to the input side of the material. This opposite side is referred to as an output side hereinafter.

The input side and the output side of the material 3 are optically polished.

A plurality of electrode pairs 4, 5 and 6 are arranged in this order from the input side of the material 3 on the opposed two upper and lower surfaces thereof along the optical path of the beam 1. The upper and lower direction in this embodiment corresponds to the direction of axis Y. The beam 1 passes through the material 3 between the upper and the lower surfaces thereof.

The first electrode pair 4 comprises a pair of electrode films 4a and 4b and functions to the beam 1 as a lens in the direction of axis Y. Each of the films 4a and 4b is of a rectangular strip shape having a relatively narrow width as illustrated in FIG. 1a. A first power source 7 is connected between the films 4a and 4b through the ground to apply a voltage of $V_1$ between the films 4a and 4b. The power source 7 is connected to a not shown control system and a switching system to selectively supply the voltage of $V_1$ between the films 4a and 4b.

The electrode pair 5 also constitutes a lens functioning electrode pair and comprises two pairs of electrode films $5a_1$, $5b_1$ and $5a_2$, $5b_2$. The pair 5 functions as a lens in the direction of axis X instead of Y as is the case of the pair 4. Each of the films $5a_1$, $5b_1$ and $5a_2$, $5b_2$ has a shape of a narrow rectangular strip. The films $5a_1$ and $5a_2$ are disposed on the upper surface of the material 3 in such a way that a gap is formed therebetween in the center portion in the direction of axis X so that the films are arranged in both sides of the beam 1 in the direction of axis X, as illustrated in FIG. 1a. The films $5b_1$ and $5b_2$ are disposed on the lower surface of the material 3 in a same manner as the films $5a_1$ and $5a_2$. The films are connected to a power source 8 for applying a voltage of $V_2$ between the electrode pair 5. The power source 8 is also connected to the not shown controlling system and the switching system to selectively supply the voltage between the films $5a_1$, $5b_1$ and $5a_2$, $5b_2$.

The electrode pair 6 constitutes a deflection functioning pair which functions as a deflector to deflect the beam 1 in the direction of axis X. The pair 6 comprises a pair of electrode films 6a and 6b. Each of the films 6a and 6b has a right-angled triangle shape and are disposed on the upper and the lower surfaces of the material 3 in such a way that the hypotenuse thereof obliquely crosses the optical path as seen from the upper side of the material 3, as illustrated in FIG. 1a. A power source 9 of voltage $V_3$ is connected between the films 6a and 6b through the ground. The power source 9 is also connected to the not shown control system and the switching system to selectively supply the voltage to between the films 6a and 6b.

The above-mentioned electrode films are made from, for example, gold (Au) or may be made from any other electric conductive material. The electrode films are formed on the electrooptic material 3 by a vacuum evaporation method, for instance.

In the structure mentioned above, the linearly polarized beam 1 enters into the electrooptic material 3 from the input side surface thereof. The beam 1 passes through the material 3 between the lens functioning electrode films 4a, 4b, 5a and 5b and the deflection functioning electrode films 6a and 6b and emits out of the material 3 through the output side end surface as an output beam 10.

When the voltage is not applied to any of the electrode pairs 4, 5 and 6, the material 3 is merely an optical medium through which the incident beam passes as it is. That is, when the power is off, the pairs 4, 5 and 6 do not function as a lens nor deflector, therefore the incident beam 1 is not acted on by the material 3 and emits out of the material 3 as it is without being deflected or deformed as an output beam 10.

When the pair 4 is supplied with the voltage $V_1$ and the pair 5 is supplied with the voltage $V_2$, a predetermined refractive index distribution is generated in the material 3 between each of the pairs 4 and 5 where the lens function of each pair influences the material 3. The pair 4 functions as a condenser lens for converging the beam in the direction Y whereas the pair 5 functions as a condenser lens for converging the beam in the direction X.

In this state, when the pair 6 is not supplied with the voltage, the portion of material 3 between the pair 6 has no deflection function. Therefore, the incident beam 1 that receives the lens function from the pairs 4 and 5 passes straight through the material 3 without being deflected so that the output beam 10 converges to a point B on the straight extension of the optical path of the beam 1.

On the other hand, in the above-mentioned state in which the pairs 4 and 5 are supplied with the voltage, respectively, when the pair 6 is also supplied with the voltage $V_3$, the refractive index of the material 3 changes in the portion where the function of the pair 6 influences so that the beam is deflected in the direction X. Therefore, the incident beam 1 receives the lens functions from the pairs 4 and 5, respectively, in the directions X and Y, respectively, and further receives the deflection function from the pair 6, so that the output beam 10 converges to a point B' which is shifted from the point B in the direction X, as illustrated in FIG. 1a.

The lens function of the device 2 in accordance with the above-mentioned embodiment of the present invention is further described in detail hereinafter.

The material 3 does not have a lens function when voltage is not applied to the electrode. However, when the voltage $V_1$ is applied to the electrode pair 4, an electric field is generated in the material 3 around the portion of the pair 4 therein, which field has a field distribution wherein the electric field is strong around the electrode films 4a and 4b while the electric field is weak at the center portion of the material 3 between the films 4a and 4b. Similarly, when the voltage $V_2$ is applied to the pair 5, an electric field is generated in the material 3 around the portion of the pair 5 therein, which field has a field distribution wherein the electric field is strong around the electrode films 5a and 5b while the electric field is weak at the center portion of the material 3 between the films 5a and 5b. It is to be noted that the electric fields of the pairs 4 and 5 differ from each other since the shape and the size of the pairs 4 and 5 are different. According to the respective electric field generated in the material 3 around each portion of the pairs 4 and 5, the refractive index of the crystal of the material 3 changes due to the electrooptic effect (quadratic electrooptic effect) of the PLZT crystal.

Under the assumption wherein the electric field direction and the linear polarization direction are both direction Y, wherein the direction of the beam 1 is the direction Z and wherein the Y component of the refractive index in the electric field is designated as ny, the following relation is satisfied;

$$ny = n_0(1 - n_0^2 R_{33} E_y^2 / 2) \quad (1)$$

wherein $n_0$ designates the refractive index of the PLZT crystal in the state that the electric field E is zero and $R_{33}$ designates the matrix component of the quadratic electrooptic constant.

From the equation (1), it is derived that the refractive index change $\Delta ny$ by the electric field $E_y$ is represented by the following equation;

$$\Delta ny = -n_0^3 R_{33} E_y^2 / 2 \quad (2)$$

As can be seen from the equation (2), the refractive index change $\Delta ny$ is proportional to the square of the electric field intensity.

In the area where the electric field is strong, the refractive index is small. Therefore, the refractive index distribution of the PLZT crystal becomes as that the refractive index of the crystal is low near the electrode films while the refractive index becomes high around the center of the crystal. Therefore, the crystal functions as a lens functioning toward the center thereof along the direction Y around the portion of the electrode pair 4. Also, the crystal functions as a lens functioning toward the center thereof along the direction X around the portion of the electrode pair 5.

The effect of the lens function is enhanced accordingly as the electrode films 4a, 4b, 5a and 5b are elongated.

The focal length of the electrooptic lens mentioned above is considered hereinafter.

It is confirmed by an actual calculation that the refractive index distribution in the electrooptic material 3 can be regarded approximately as a parabolic distribution. The calculation is conducted in such a way that, first the electric field distribution is obtained by solving Poisson's equation by using the finite element method, then the refractive index distribution is calculated from the equation (1). From the calculation mentioned above, a distribution similar to the parabolic distribution is obtained.

Therefore, under the assumption that the refractive index distribution in the material 3 when the voltage is applied thereto is the parabolic distribution, the Y component of the refractive index distribution can be approximated to the following equation;

$$ny = n_0(1 - n_0^2 R_{33} E_y^2 / 2 - \alpha^2 n_0^2 R_{33} E_y^2 Y^2 / 2) \quad (3)$$

wherein $\alpha$ designates a constant determined by the structure of the pair 4 of the device 2 having the convergent lens function in the direction Y.

On the other hand, the behavior of the beam can be represented by the following ray equation;

$$\frac{d}{ds}\left(n \frac{dr}{ds}\right) = \text{grad} \cdot n \quad (4)$$

With respect to the paraxial rays, the equation (4) can be easily solved in the case of the parabolic distribution of the equation (3) so that the focal length f can be obtained as the following equation;

$$f = \frac{1}{\sqrt{n_0^2 R_{33} E_y^2}} \times \frac{1}{\alpha} \times \cot(\sqrt{n_0^2 R_{33} E_y^2} \cdot \alpha \cdot l) \quad (5)$$

wherein l represents the length of the electrode films 4a and 4b.

The above equation (5) represents the focal length f of the lens constituted by the electrode pair 4 having a convergent function in the direction Y. The focal length f' of the lens constituted by the electrode pair 5 having a convergent function in the direction X is similarly represented by the following equation;

$$f' = \frac{1}{\sqrt{n_0^2 R_{33} E_y^2}} \times \frac{1}{\alpha'} \times \cot(\sqrt{n_0^2 R_{33} E_y^2} \cdot \alpha' \cdot l') \quad (6)$$

wherein $\alpha'$ designates a constant determined by the structure of the pair 5 of the device 2 having a convergent lens function in the direction X and wherein l' designates the length of the electrode films 5a and 5b.

A deflection function of the electrooptic device 2 in accordance with the embodiment of the present invention is described hereinafter with reference to FIG. 2.

Figure 2:
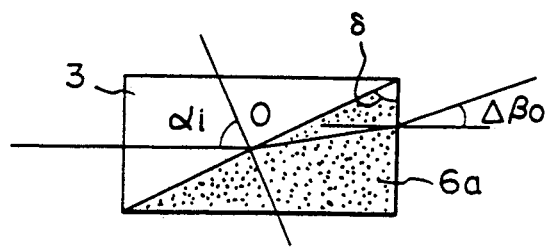
FIG. 2 is an explanatory view representing and enlarging a part of the optical system of FIG. 1a for explaining a deflection function thereof.

FIG. 2 illustrates the electrode film 6a of the electrode pair 6 of the device 2 of FIG. 1a or 1b. The structure of the other film 6b of the pair 6 is substantially the same as the film 6a. The apex angle of the right angle triangle film 6a is represented by $\delta$. The incident angle of the beam 1 to the film 6a through the hypotenuse thereof is represented by $\alpha i$. When the voltage $V_3$ is not applied to the pair 6, the material 3 does not function to deflect the beam so that the beam passes straight through the material 3. When the voltage $V_3$ is applied to the pair 6, a refractive index change is generated in the material 3 due to the function of the electric field in accordance with the equation (1). Therefore, the material 3 becomes equivalent to a triangle prism. Therefore, the beam 1 is refracted at the boundary point 0 in the material 3 and emits out of the material 3 through the output surface thereof in a state of being deflected by an angle $\Delta \beta o$.

The minute deflection angle $\Delta \beta o$ can be obtained by Snell's law and differential calculations and approximated to the equation as follows:

$$\Delta \beta o \approx \frac{\sin \alpha i}{2 \cos \beta o} \times \frac{n_0^3 R_{33} E_y^2}{\sqrt{1 - \sin^2 \alpha i - n_0^2 R_{33} E_y^2}} \quad (7)$$

As can be seen from the equation (7), the angle $\Delta \beta o$ increases in proportion to the electric field $E_y^2$.

As can be seen from the explanation mentioned above, in accordance with the embodiment of the optical controlling device 2 of the present invention, it becomes possible to independently control the focal point and the deflection angle of the output beam 10, respectively, by controlling the voltages $V_1$, $V_2$ and $V_3$, applied to the pairs 4, 5 and 6, respectively. Therefore, the device of the present invention becomes applicable to various systems for a wide range of purposes in the optical information processing field.

Figure 3A:
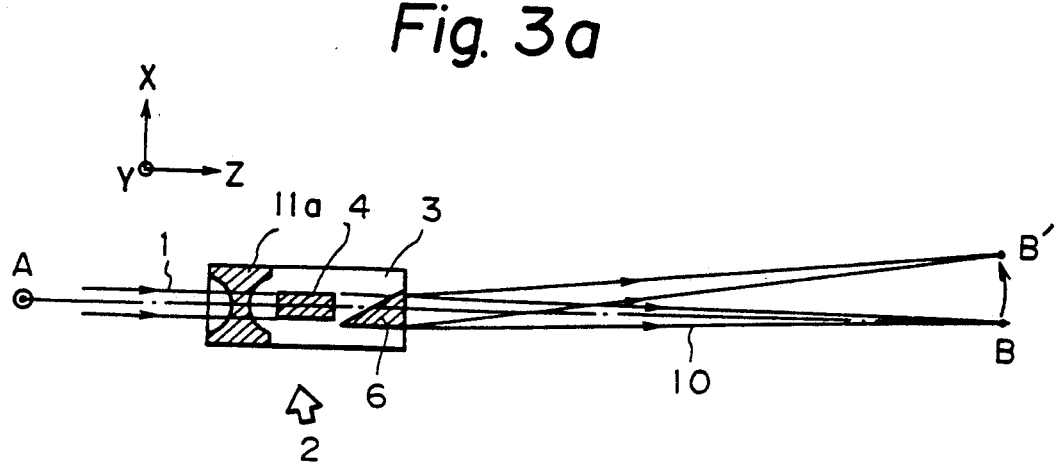
FIG. 3a is a plan view of an optical system in accordance with another embodiment of the present invention.
Figure 3B:
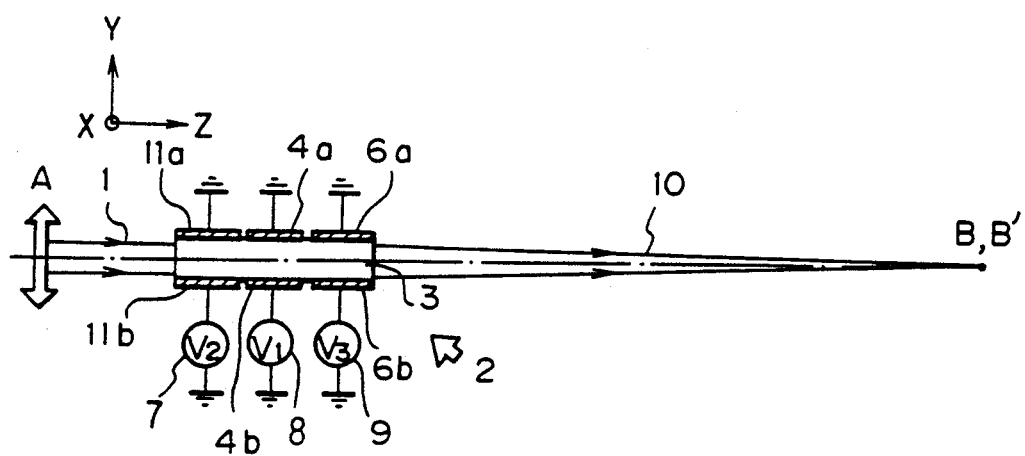

Another embodiment of the present invention is described hereinafter with reference to FIGS. 3a and 3b. The same or corresponding parts as the first embodiment are designated by the same references as the first embodiment.

This embodiment comprises an electrode pair 11 disposed on the upper and the lower surfaces of the material 3 instead of the pair 5 of the first embodiment. The pair 11 comprises a pair of electrode films 11a and 11b each of which has a shape of a thick I wherein semicircles are cut away from both sides of a rectangle, as illustrated in FIG. 3a. The pair 11 is connected to a power source 7 to supply a voltage $V_2$ to the pair 11.

In accordance with the structure mentioned above, when the voltage $V_2$ is applied to the pair 11, an electric field is generated corresponding to the shape of the films 11a and 11b. The refractive index of the material 3 changes according to the electric field so that the refractive index becomes low in the area where the electric field is generated whereas the refractive index becomes high in the area where the electric field is not generated, i.e., in the semicircle cut away portions. Accordingly, the material 3 functions as a cylindrical lens so that the beam is converged in the direction X by the lens function of the material 3. The construction and function of this embodiment are substantially the same as those of the first embodiment.

A further embodiment of the present invention is described hereinafter with reference to FIGS. 4a and 4b.

This embodiment comprises an optical lens 12 in combination with the device 2 of the first embodiment. The lens 12 is disposed in the output side of the device 2. When all of the voltages $V_1$, $V_2$ and $V_3$ are off, the device 2 does not function as a lens nor as a deflector so that the incident beam 1 passes straight through the device 2 and the output beam 10 converges to a focal point C of the lens 12.

When the voltages $V_1$ and $V_2$ are applied to the pairs 4 and 5, respectively, and the voltage $V_3$ is zero, the device 2 functions as a lens so that the convergent point of the output beam 10 is shifted from the point C to a point D on the optical path thereof. The location of the point D can be continuously changed by controlling the voltages $V_1$ and $V_2$, respectively.

Figure 4A:
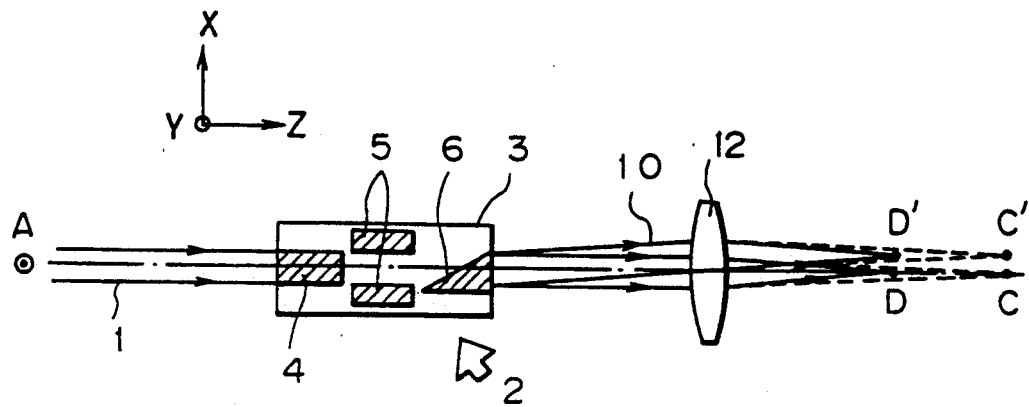
FIG. 4a is a plan view of an optical system in accordance with a further embodiment of the present invention.
Figure 4B:
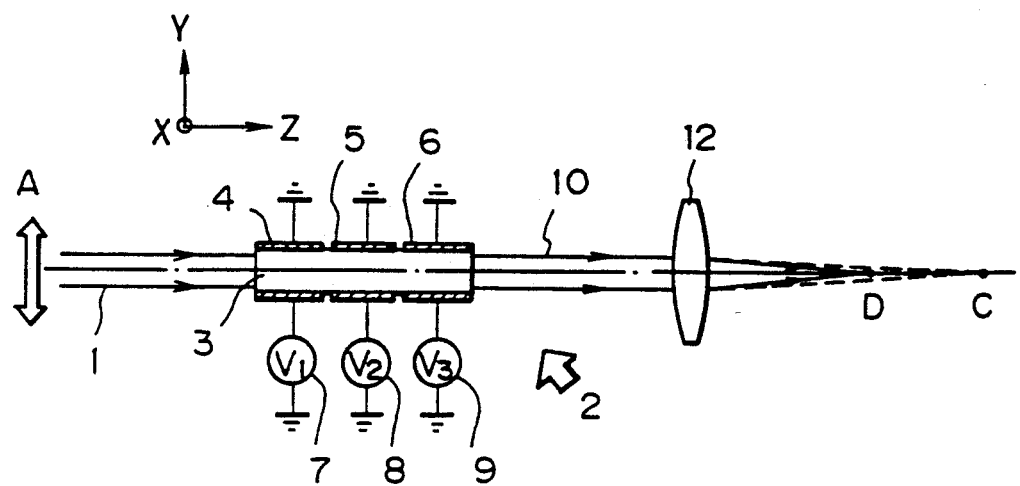

Also, when the voltage $V_3$ is applied to the pair 6, the device 2 functions as a deflector in addition to the lens so that the convergent point of the output beam 10 is shifted to a point between points C' and D' dislocated from the optical axis, as illustrated in FIG. 4a.

Figure 5A:
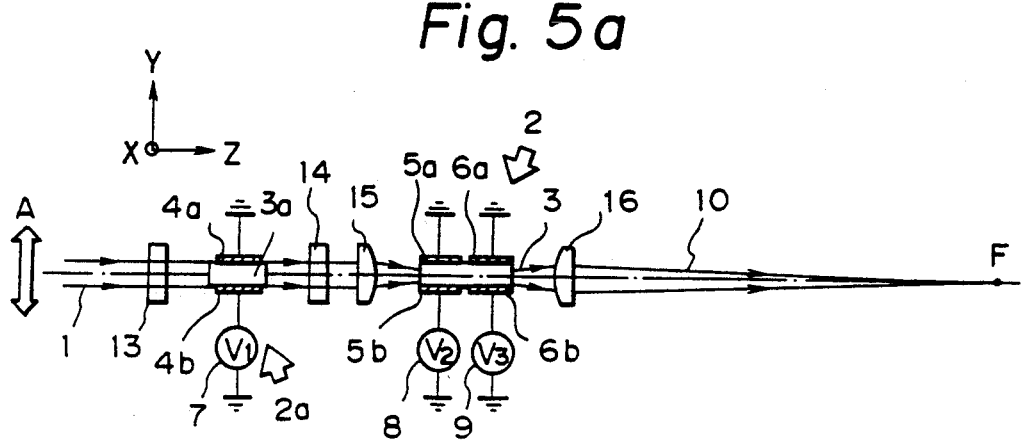
FIG. 5a is a plan view of an optical system in accordance with a still further embodiment of the present invention.
Figure 5B:
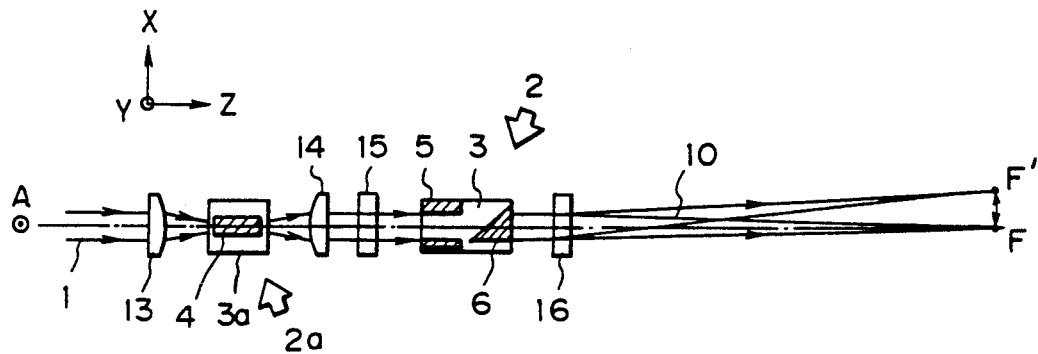

A still further embodiment of the present invention is described hereinafter with reference to FIGS. 5a and 5b.

This embodiment comprises an electrooptic device 2a comprising an electrooptic material 3a on which an electrode pair 4 is arranged and an electrooptic device 2 comprising an electrooptic material 3 on which electrode pairs 5 and 6 are arranged. The devices 2 and 2a are disposed on the optical path of the beam 1 and are separated from each other. Also, a cylindrical lens 13 is disposed in the input side of the device 2a which has a lens function in the direction Y. Also, a cylindrical lens 14 is disposed in the output side of the device 2a. The cylindrical lenses 13 and 14 have a lens function in the direction X.

On the other hand, a cylindrical lens 15 is disposed in the input side of the device 2 which has a lens function in the direction X. Also, a cylindrical lens 16 is disposed in the output side of the device 2. The cylindrical lenses 15 and 16 have a lens function in the direction Y.

The device 2a is disposed at a focal point of the lenses 13 and 14. Also, the device 2 is disposed at a focal point of the lenses 15 and 16.

The embodiment having the structure mentioned above functions as follows.

The incident beam 1 is first flattened in the direction Y by the function of the lens 13. The flat beam 1 enters into the device 2a. When the voltage $V_1$ is applied to the pair 4, the device 2a functions as a lens in the direction Y.

It is to be noted that the beam is flattened in advance in the same direction Y as that of the lens function of the device 2a, which means that the high convergent characteristic side of the beam, i.e., the low spherical aberration side of the beam, receives the lens function from the device 2a, which makes it possible to minimize the aberration and upgrade the lens function of the device 2a.

The output beam emitted from the device 2a is paralleled by the cylindrical lens 14 and flattened in the direction X by the lens 15. After that, the beam enters into the device 2. The output beam emitted from the device 2 is functioned by the lens 16.

When the voltages $V_2$ and $V_3$ are applied to the pairs 5 and 6, respectively, the beam receives the lens function in the direction X and the deflection function from the device 2.

The incident beam is flattened in the direction X prior to entering into the device 2 which has the lens function in the same direction X, the aberration is minimized and the lens function is upgraded, as in the case of the device 2a mentioned above.

The beam 10 converges to a point between points F and F' in accordance with the voltages $V_1$, $V_2$ and $V_3$. The convergent point of the beam 10 can be controlled by adjusting the voltages $V_1$, $V_2$ and $V_3$, respectively.

When all of the voltages $V_1$, $V_2$ and $V_3$ are zero, the devices 2a and 2 do not function to converge or deflect the beam so that the beam simply passes through the devices 2a and 2 without receiving the lens function or the deflection function therefrom. In this case, the beam 10 is functioned only by the lenses 13, 14, 15 and 16 to be flattened in the respective directions and emits out of the device 2 in the state of parallel rays without being focussed.

A still further embodiment of the present invention is described hereinafter with reference to FIGS. 6 to 10.

An incident beam 101 is linearly polarized in the direction of a double-head arrow A. This embodiment of the optical controlling device of the present invention comprises a cylindrical lens 102, an electrooptic lens 103 and a cylindrical lens 104 disposed in this order on an optical path of the beam 101 along the direction Z. The lenses 102 and 104 have a convergent function in the direction X.

Figure 6A:
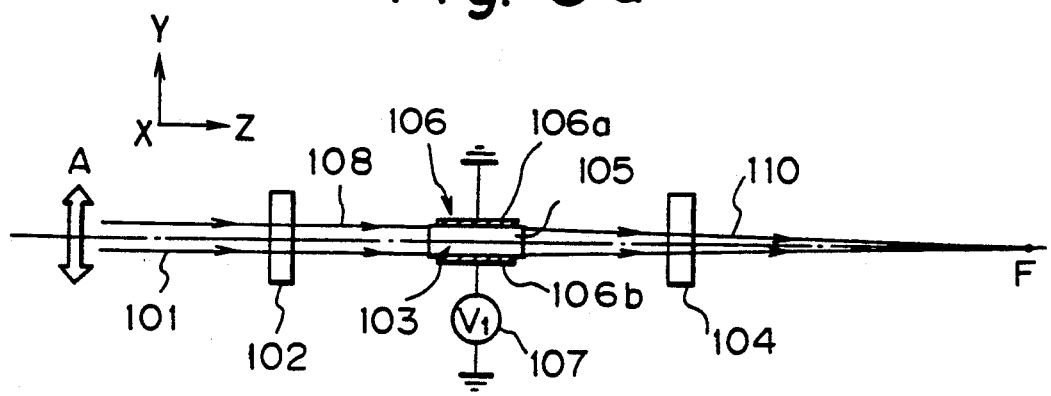
FIG. 6a is a plan view of an optical system in accordance with a still further embodiment of the present invention.
Figure 6B:
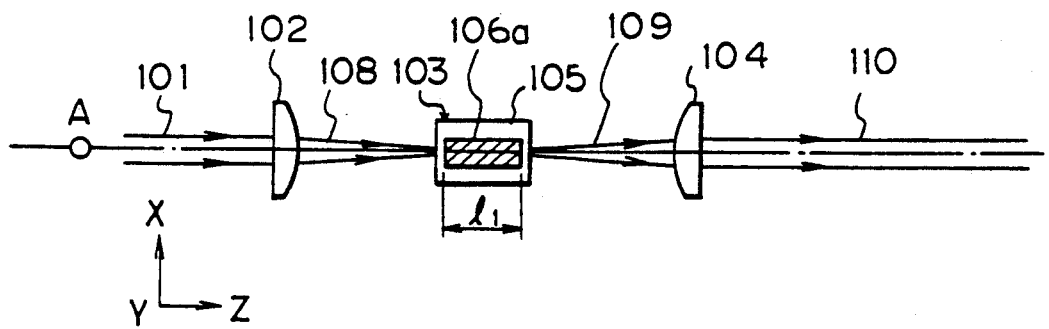

The lens 103 comprises a rectangular box shaped electrooptic material 105 made from, for example, an electrooptic crystal of PLZT. The composition of the crystal is preferably 9.0/65/35 but is not limited to this ratio. The material 105 is disposed at a point of beam waist of the convergent beam which is converged by the lens 102. The input end surface and the output end surface of the material 105 are optically polished. An electrode pair 106 is arranged on the upper and the lower surfaces of the material 105 in FIG. 6a which surfaces are disposed in the opposed both sides of the optical path of the beam 101 which is in parallel with the axis Z. The pair 106 comprises a pair of electrode films 106a and 106b. Each of the films 106a and 106b has a shape of a narrow strip having a size of width $d_1$ and length $l_1$ as illustrated in FIG. 6b. Each electrode film is disposed along the center of the upper and the lower surfaces along the direction of the optical path of the beam 101. A power source 107 is connected between the electrode films 106a and 106b through the ground. The power source 107 is arranged to apply a voltage $V_1$ between the films 106a and 106b through a not shown controlling system and a switching system. The electrode films are made from, for example, gold (Au) but not limited to this metal. Also, the films may be formed by a vacuum evaporation method.

The embodiment of the electrooptic device of the present invention having the structure mentioned above functions as follows.

The beam 101 which is linearly polarized in the direction Y is converged in the direction X by the lens 102 to be changed to a convergent beam 108 which enters into the material 105 of the lens 103. The beam 108 input to the lens 103 is again diverged in the direction X and emits out of the lens 103 as a divergent beam 109.

When the voltage is not applied to the pair 106, the beam 109 is converged in the direction X by the lens 104 and changed to a parallel beam.

On the other hand, when the voltage is applied to the pair 106, the refractive index in the material 105 changes due to the electrooptic effect so that the material 105 functions as a condenser lens which converges the beam in the direction Z. The convergent beam 110 output from the material 105 converges to a focal point F after passing through the lens 104, as illustrated in FIG. 6a. It is to be noted that the beam 110 is converged only in the direction Y.

As mentioned above, the linearly polarized beam 101 enters into the material 105 through the input end surface thereof, passes through the material 105 between the electrode films 106a and 106b and emits out of the material 105 through the output end surface thereof.

When the voltage is not applied to the pair 106, the material 105 is merely an optical medium through which the beam passes without receiving any optical functions therefrom.

On the other hand, when the voltage $V_1$ is applied to the pair 106, a refractive index distribution is generated in the material 105 around the pair 106 so that the material 105 functions as a lens. Therefore, the beam 101 receives the lens function from the material 105 while passing therethrough.

The lens function of the electrooptic lens 103 is further described in detail hereinafter.

Figure 7:
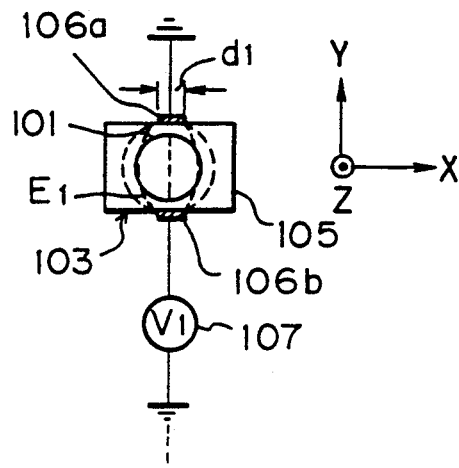
FIG. 7 is an explanatory view representing a part of the optical system of FIG. 6a for explaining an electric field thereof in a state that a voltage is applied thereto.

First, when the voltage $V_1$ is applied to the pair 106, an electric field $E_1$ is generated in the material 105, which field is represented in dashed lines in FIG. 7. The electric field has an intensity distribution in which the electric field is strong near the electrode films 106a and 106b while the electric field is weak around the center of the material 105. In accordance with such an electric field distribution, a refractive index distribution is generated in the crystal of PLZT due to the electrooptic effect guadratic electrooptic effect).

Under the assumption that the electric field direction and the linear polarization direction are the direction Y and that the propagation direction of the beam 101 is the direction Z, the Y component $n_y$ of the refractive index of the material 105 in the electric field is represented as follows:

$$n_y = n_0(1 - n_0^2 R_{33} E_y^2/2) \quad (11)$$

wherein $n_o$ designates the refractive index of the electrooptic crystal of PLZT in the state that the electric field E is zero and $R_{33}$ designates the matrix component of the quadratic electrooptic constant.

The refractive index change $\Delta n_y$ due to the electric field $E_y$ is derived from the equation (11) and represented as follows;

$$\Delta n_y = -n_0^3 R_{33} E_y^2/2 \quad (12)$$

As can be seen from the equation (12), the refractive index change $\Delta n_y$ is in proportion to the square of the electric field intensity.

The refractive index becomes low accordingly as the electric field becomes strong. Therefore, the refractive index distribution in the PLZT crystal becomes such that the refractive index is low near the electrodes while the refractive index is high around the center of the crystal. Accordingly, a lens effect in the direction Y is generated in the material 105 of the crystal toward the center thereof. The lens effect becomes large accordingly as the electrode length $l_1$ is elongated.

Therefore, the beam 101 which is linearly polarized in the direction Z receives the lens function from the electrooptic lens 103 along the direction Y in the material 105 according to the voltage $V_1$ applied to the electrode film having a size of width $d_1$ and length $l_1$, thereby the beam is converged to the focal point F.

Figure 8A:
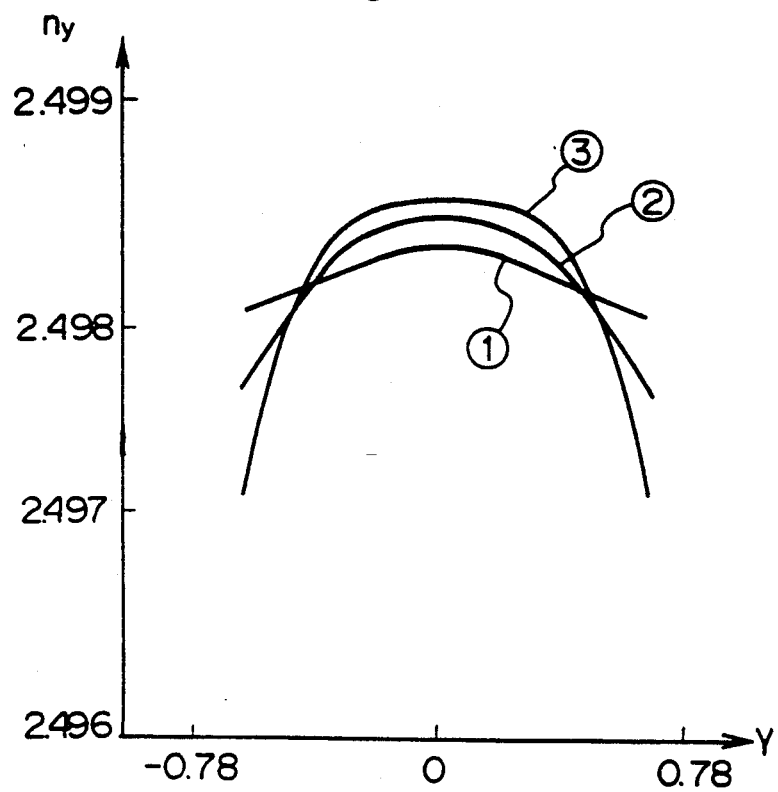
FIG. 8a is a graphical view of refractive index distribution in an electrooptic material representing lines of refractive index characteristic curve corresponding to different positions in the electrooptic material.
Figure 8B:
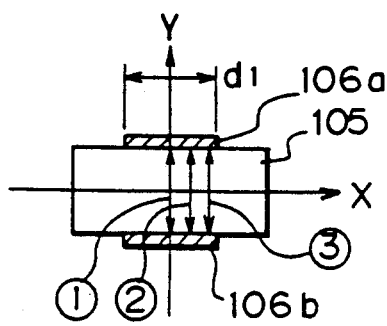

FIG. 8a represents a graph of a calculation result of refractive index distributions in the material 105 itself, which is used in the structure in accordance with the above-mentioned embodiment of the present invention. The refractive index distributions are obtained by a finite-element method. The graph represents three lines ①, ② and ③ which represents refractive index curves at positions ①, ② and ③, respectively, in the material 105 as indicated in FIG. 8b. The X-coordinates of the positions ①, ② and ③ are X=0 (line ①), X=0.25 mm (line ②) and X=0.5 mm (line ③), respectively, wherein the origin of the coordinate is the center of the material 105. Each of the graphical lines ①, ② and ③ of FIG. 8a represents the refractive index along the coordinate Y at each of the corresponding positions ①, ② and ③ of FIG. 8b. The calculation conditions are such that $n_0 = 2.5$, the electric field intensity $E_z = 1000$V/mm, the width of electrode $d_1 = 1.1$ mm, and the thickness of the material 105 in the direction Y is 1.4 mm.

To consider the convergent characteristic of the electrooptic lens of the material 105, the beam trace is simulated by the Runge-Kutta method on the basis of the refractive index distribution of FIG. 8a wherein the length of the electrode $l_1 = 8.0$ mm. The simulation results in that the beam 101 after passing through the material 105 has an aberration since the material 105 has different refractive index distributions at different positions ①, ② and ③ therein, respectively, as represented in the graph of FIG. 8a.

Figure 9:
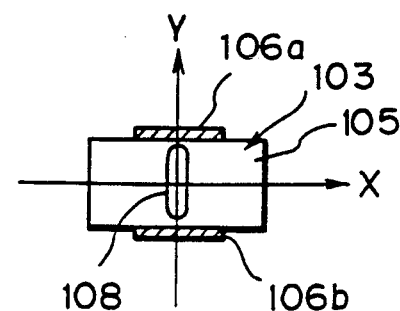
FIG. 9 is an explanatory view for explaining a sectional shape of an optical beam incident to an electrooptic material and representing a front view of the material.

However, in accordance with the structure of the above-mentioned embodiment of the present invention, the beam 101 is converged in the direction X by the lens 102 prior to entering into the material 105 so that the beam incident upon the material 105 is arranged as the convergent beam 108 which has a beam waist where the material 105 is located. Therefore, the beam 108 which is flattened in the direction X enters into the material 105, as illustrated in FIG. 9. As a result, especially around the center (X=0 mm) of the material 105, the refractive index distribution becomes similar to the square root distribution along the entire length in the direction Z. Therefore, in spite of the refractive index distributions in the material 105 represented in FIG. 8a, the aberration is minimized in the flattened beam 108. That is, it becomes possible to realize a convergent characteristic in which the aberration is minimized by adjusting the position X of the beam 108 and the electrode width $d_1$.

Figure 10A:
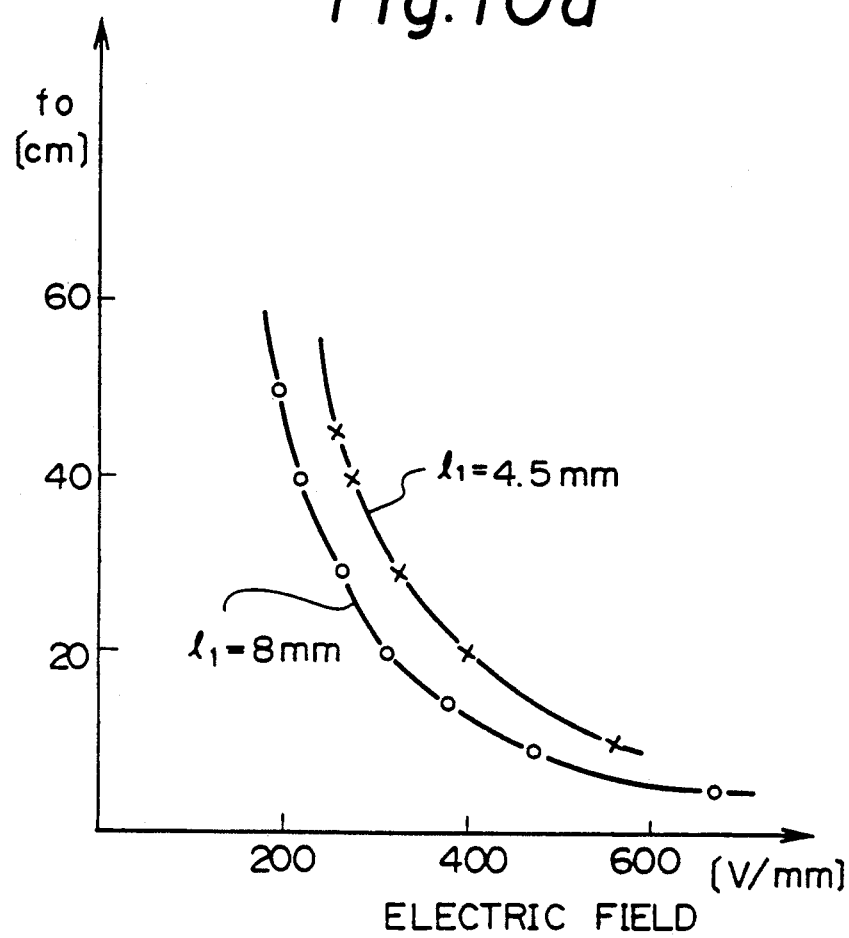
FIG. 10a is a graphical view of focal length characteristic of an electrooptic material representing lines of the focal distance characteristic curve in relation to strength of an electric field with respect to electrooptic materials of different shape.
Figure 10B:
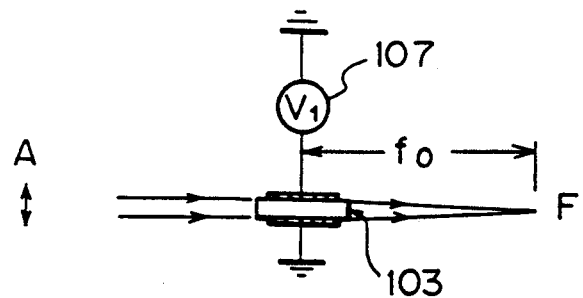
FIG. 10b is an explanatory view for explaining a condition of the focal length characteristic of FIG. 10a and representing a side view of the electrooptic material.
Figure 10C:
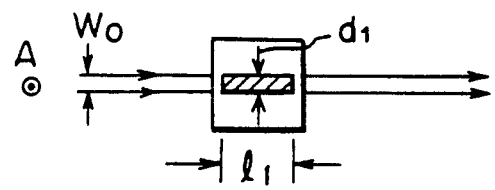
FIG. 10c is an explanatory view for explaining a condition of the focal length characteristic of FIG. 10a and representing a top view of the electrooptic material.

FIG. 10a represents a graph of focal length $f_o$ of the electrooptic lens 103 in relation to the electric field intensity, representing actually measured results with respect to the structure of the optical device in accordance with the embodiment of the present invention. The measurement was conducted under the condition of FIGS. 10b and 10c wherein the electrode width $d_1 = 0.5$ mm, the electrode length $l_1 = 4.5$ mm and 8 mm, and the beam diameter $w_0 = 1.2$ mm. In accordance with the result of this measurement, the focal length $f_0$ becomes shortened in inverse proportion to the square of the electric field intensity.

A still further embodiment of the present invention is described hereinafter with reference to FIGS. 11 to 15.

Figure 11A:
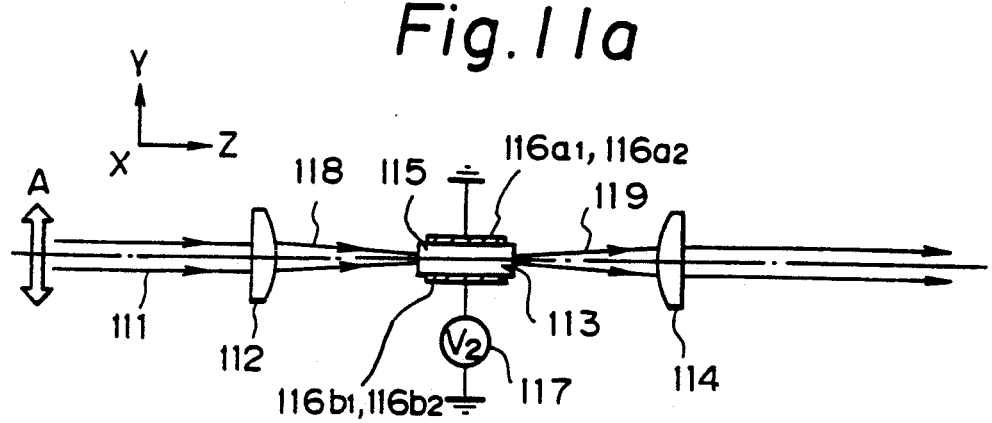
FIG. 11a is a side view of an optical system in accordance with a still further embodiment of the present invention.

An incident beam 111 is linearly polarized in advance, as in the case of the above-mentioned embodiments, in the direction of an arrow A of FIG. 11a. This embodiment of the optical device comprises a cylindrical lens 112, an electrooptic lens 113 and a cylindrical lens 114 which are disposed on an optical axis of the beam 111 in this order. The lens 113 is arranged to converge the beam in the direction X instead of the direction Y as is the case of the lens 103 of the former embodiment. Accordingly, the lenses 112 and 114 are arranged to converge the beam in the direction Y to the contrary.

Figure 12:
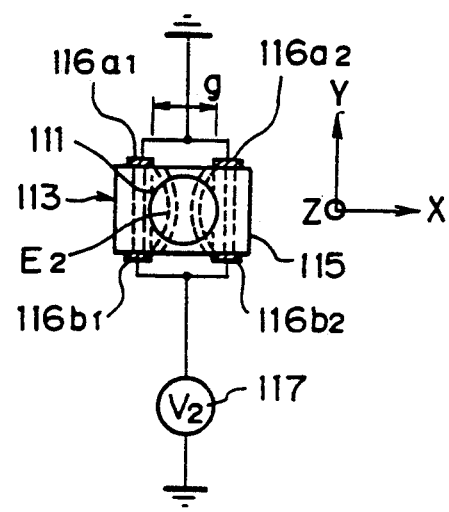
FIG. 12 is a sectional view of the electrooptic material used in the optical system of FIG. 11a for representing a state of electric field under a condition wherein a voltage is applied to the electrooptic material.

The lens 113 comprises an electrooptic material 115 which is disposed at a position of beam waist due to the lens 112 and has an electrode pair 116 formed on both surfaces thereof with respect to the direction Y (upper and lower surfaces in FIG. 11a). The pair 116 comprises two pairs of electrode films $116a_1$, $116b_1$ and $116a_2$, $116b_2$, each film having a longitudinal strip shape having a length of $l_2$. The films $116a_1$ and $116a_2$ are disposed on the upper surface of the material 115 along the direction of the optical axis (direction Z) and forming a gap (g) therebetween (FIG. 12). Similarly, the films $116b_1$ and $116b_2$ are disposed on the lower surface of the material 115. A power source 117 having a voltage $V_2$ is connected to the pair 116.

The structure of the electrooptic device mentioned above functions as follows.

The beam 111 which is linearly polarized in the direction Y is converged in the direction Y by the lens 112. The convergent beam 118 is introduced to the lens 113 which is disposed at the position of beam waist of the convergent beam 118. The beam 118 emits out of the lens 113 in a state of a divergent beam 119 which diverges in the direction Y since the beam 119 has passed over the beam waist.

When the voltage is not applied to the pair 116, the divergent beam 119 is converged in the direction Y by the lens 114 and changed to a parallel beam.

Figure 11B:
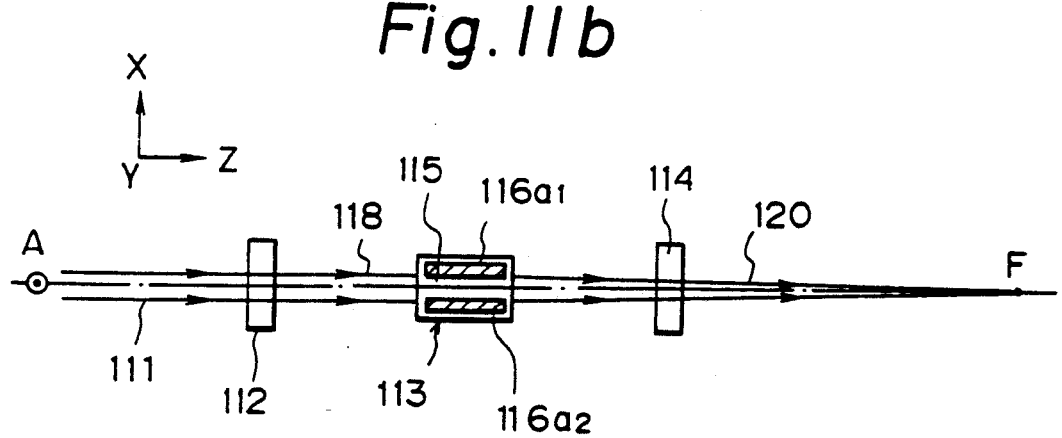

Whereas when the voltage $V_2$ is applied to the pair 116, the beam 118 receives a lens function from the material 115 in the direction X so that the beam 118 is changed to a convergent beam 120 which converges to a focal point F, as illustrated in FIG. 11b.

The lens function of the material 115 is further described below with reference to FIG. 12.

When the voltage $V_2$ is applied to the pair 116 of the lens 113, an electric field $E_y$ is generated in the material 115 in accordance with the shape and the layout of the electrode films, as illustrated by dashed lines in FIG. 12. As a result, a refractive index distribution is generated in the material 115 wherein the refractive index becomes high around the center of the material 115, that is around the position X=0 in the X-Y plane, wherein the origin of the coordinates is the center of the material 115 of FIG. 12, due to the electrooptic effect of the PLZT crystal. This refractive index distribution is represented by the equation (11) mentioned before. Accordingly, the material 115 functions as a lens in the direction X toward the center thereof. Such a lens effect is enhanced according as the electrode length $l_2$ is elongated.

Therefore, when the beam 111 enters into the material 115, the beam 111 receives the lens function in the direction X from the material 115 due to the electrode pair 116 to which the voltage $V_2$ is applied. The beam 111 converges to the focal point F, accordingly.

Figure 13A:
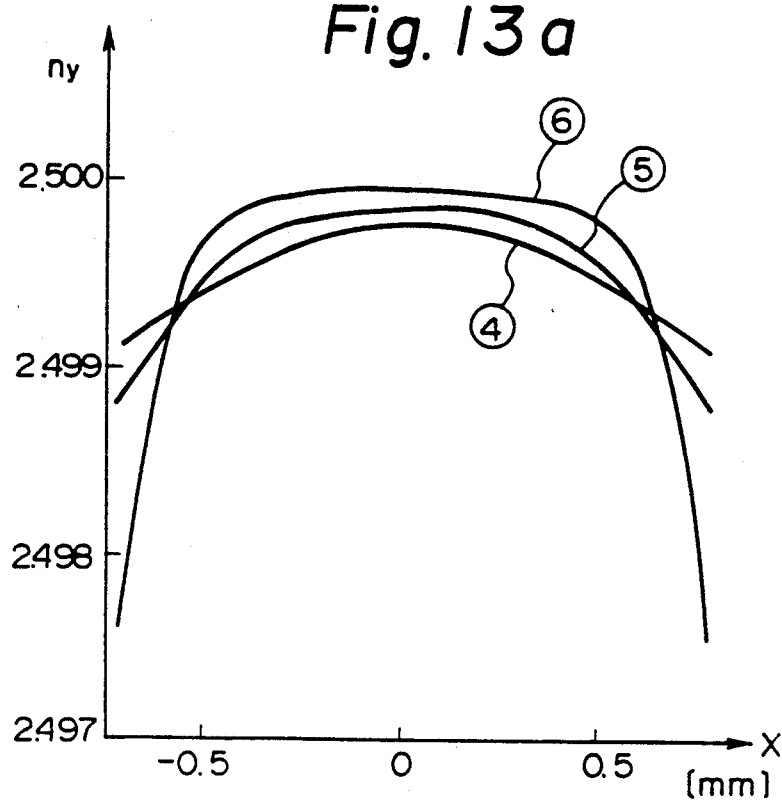
FIG. 13a is a graphical view of refractive index distribution of an electrooptic material representing lines of refractive index characteristic curve at different positions in the electrooptic material.
Figure 13B:
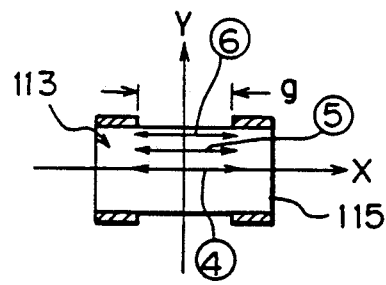

FIG. 13a represents a graph of a calculation result of refractive index distributions in the material 115 itself which is used in the structure in accordance with the above-mentioned embodiment of the present invention. The refractive index distributions are obtained by a finite-element method. The graph represents three lines ④, ⑤ and ⑥ which represents refractive index curves at positions ④, ⑤ and ⑥, respectively, in the material 115 as indicated in FIG. 13b. The Y-coordinates of the positions ④, ⑤ and ⑥ are Y=0 mm (line ④), Y=0.3 mm (line ⑤) and Y=0.6 mm (line ⑥), respectively, wherein the origin of the coordinate is the center of the material 115. Each of the graphical lines ④, ⑤ and ⑥ of FIG. 13a represents the refractive index along the coordinate X at each of the corresponding positions ④, ⑤ and ⑥ of FIG. 13b. The calculation conditions are such that $n_0 = 2.5$, the electric field intensity $E_z = 1000$ V/mm, the gap (g) between the electrodes are 1.5 mm, and the thickness of the material 115 in the direction Z is 1.4 mm.

To consider the convergent characteristic of the electrooptic lens of the material 115, the beam trace is simulated by the Runge-Kutta method on the basis of the refractive index distribution of FIG. 13a wherein the length of the electrode $l_1 = 8.0$ mm. The simulation results in that the beam 111 after passing through the material 115 has an aberration since the material 115 has different refractive index distributions at different positions ④, ⑤ and ⑥ therein, respectively, as represented in the graph of FIG. 13a.

Figure 14:
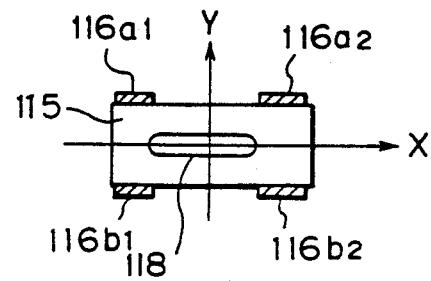
FIG. 14 is an explanatory view for explaining a sectional shape of an optical beam incident to an electrooptic material representing a front view of the material.

However, in accordance with the structure of the above-mentioned embodiment of the present invention, the beam 111 is converged in the direction Y by the lens 112 prior to entering into the material 115 so that the beam incident upon the material 115 is arranged as the convergent beam 118 which has a beam waist where the material 115 is located. Therefore, the beam 118 which is flattened in the direction Y enters into the material 115, as illustrated in FIG. 14. As a result, especially around the center (Y=0 mm) of the material 115, the refractive index distribution becomes similar to the quadratic distribution along the entire length in the direction X. Therefore, in spite of the refractive index distributions in the material 115 represented in FIG. 13a, the aberration is minimized in the flattened beam 118.

Figure 15A:
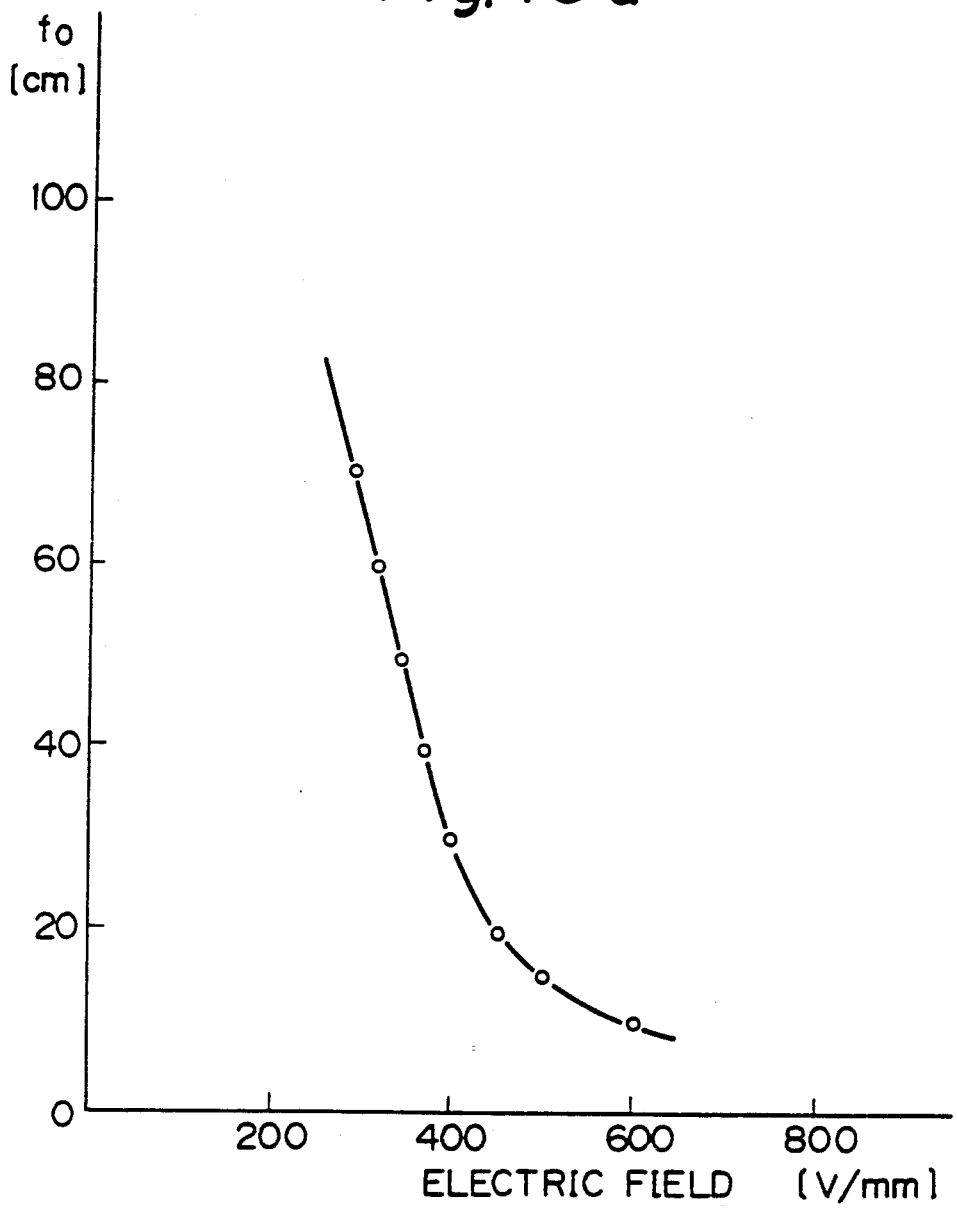
FIG. 15a is a graphical view of focal length characteristic in relation to strength of electric field.
Figure 15B:
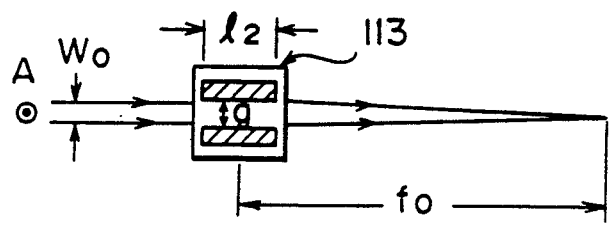
FIG. 15b is an explanatory view for explaining a condition under which the graph of FIG. 15a is obtained.

FIG. 15a represents a graph of focal length $f_o$ of the electrooptic lens 113 in relation to the electric field intensity, representing actually measured results with respect to the structure of the electrooptic device in accordance with the embodiment of the present invention. The measurement was conducted under the condition of FIGS. 15b and 15c wherein the gap between the electrodes g=1.5 mm, the electrode length $l_1$=8 mm, the beam diameter $w_o$=1.8 mm and the wavelength of the beam 118 is 633 nm. In accordance with the result of this measurement, the focal length $f_o$ becomes shortened in inverse proportion to the square of the electric field intensity, as is the case of the embodiment mentioned before.

Figure 16A:
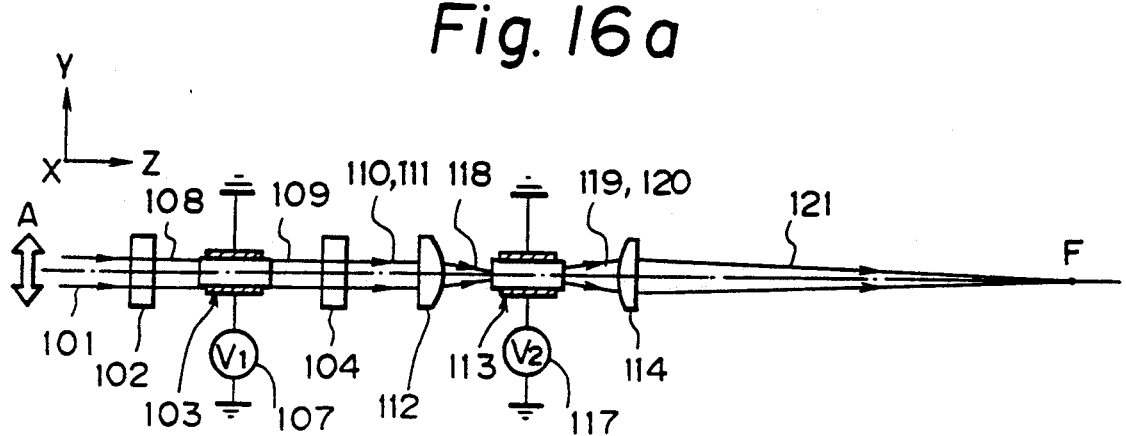
FIG. 16a is a side view of an optical system in accordance with a still further embodiment of the present invention.
Figure 16B:
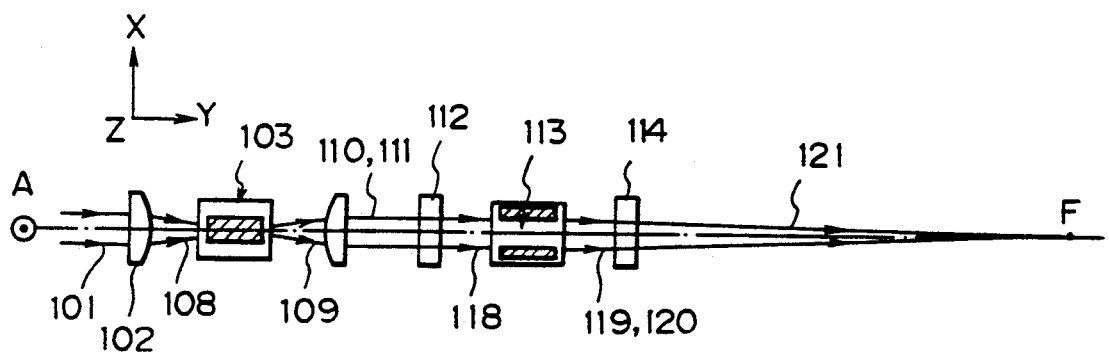

A still further embodiment of the present invention is described hereinafter with reference to FIGS. 16a and 16b.

This embodiment is a combination of the above-mentioned two embodiments of FIGS. 6 and 11. That is, the embodiment comprises a cylindrical lens 102, an electrooptic lens 103, a cylindrical lens 104, a cylindrical lens 112, an electrooptic lens 113 and a cylindrical lens 114 disposed on a same optical path in this order. The lenses 103 and 113 in this embodiment are substantially the same as those of the lenses 103 and 113 of FIGS. 6 and 11, respectively.

In accordance with such a combination structure, the two electrooptic lenses 103 and 113 functions to the beam passing therethrough in the directions X and Y, respectively, so that an output beam 121 which is convergent in the directions X and Y focuses at a point F. It is to be noted that the convergent point (focal point F) in the direction X can be coincided with that in the direction Y by adjusting the voltages $V_1$ and $V_2$, respectively, or selecting proper shape and size of the electrodes of the pairs 106 and 116, respectively. Also, it is possible to obtain a convergent flat beam by dislocating the focal points in the directions X and Y from each other.

A still further embodiment of the present invention is described hereinafter with reference to FIGS. 17 to 20.

Figure 17:
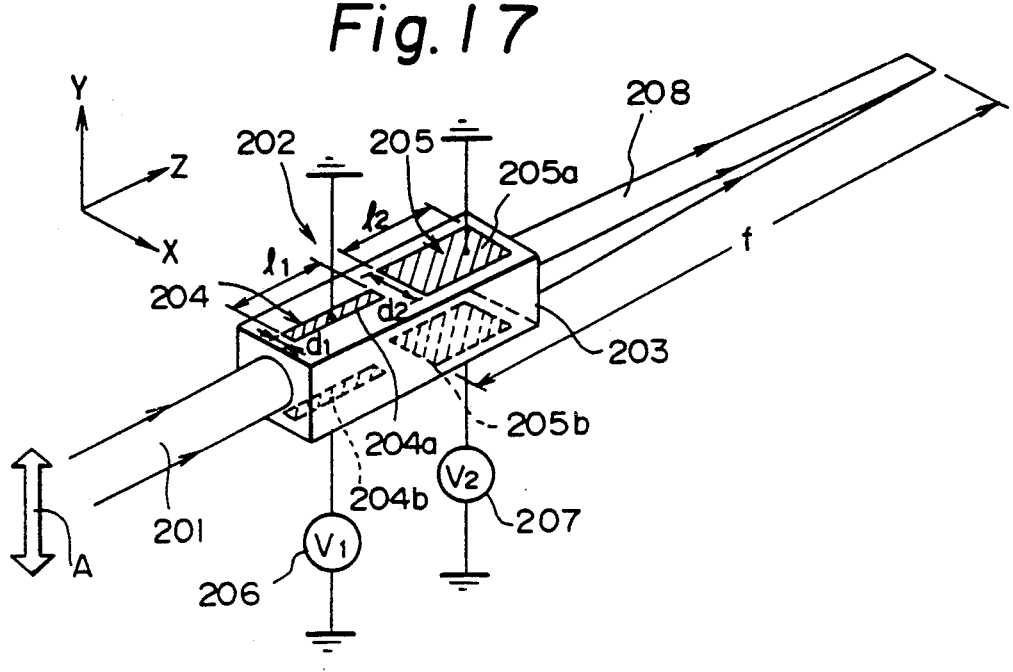
FIG. 17 is a perspective view of a still further embodiment of the present invention.

An electrooptic lens 202 having a feature of the present invention is disposed on an optical axis (in the direction Z) of an incident beam 201 which is linearly polarized in the direction of an arrow A of FIG. 17. The lens 202 comprises a rectangular box shaped electrooptic material 203 which is made from, for example, PLZT crystal. The composition of the crystal is preferably 9.0/65/35, but is not limited to this composition. The input and the output end surfaces of the material 203 is optically polished. A first electrode pair 204 and a second electrode pair 205 are formed on the opposed two surfaces (upper and lower surfaces in FIG. 17) of the material 203. The first pair 204 comprises a pair of electrode films 204a and 204b each of which has a shape of a narrow strip having a size of width $d_1$ and length $l_1$, as illustrated in FIG. 17. A first power source 206 of voltage $V_1$ is connected between the films 204a and 204b through the ground. The voltage $V_1$ is selectively applied to the pair 204 through a not shown control system and a switching system. The second pair 205 comprises a pair of electrode films 205a and 205b each of which has a relatively wide (compared to the first pair) strip shape having a size of width $d_2$ and length $l_2$. Also, a second power source 207 of voltage $V_2$ is connected between the films 205a and 205b through the ground. The voltage $V_2$ is selectively applied to the pair 205 through the control system and the switching system. The films may be made from, for example, gold (Au), but not limited to this metal. Also, the films may be formed by a vacuum evaporation method.

The embodiment of the invention having the above-mentioned structure functions as follows.

The linearly polarized beam 201 enters into the material 203 through the input end surface thereof and propagates therethrough between each of the first and the second pairs where the films thereof influence to the beam passing therebetween. The beam emits out of the material through the output end surface thereof.

When the voltage is not applied to both of the first and the second pairs 204 and 205, the material 203 is simply an optical medium through which the beam passes without receiving any functions such as a lens function or a deflection function from the material 203 so that the beam 201 emits out of the material 203 as it is as an output beam 208.

On the other hand, when the voltage $V_1$ is applied to the first pair 204 and the voltage $V_2$ is applied to the second pair 205, a refractive index distribution is generated in the material 203 in the portion where the function of the electrode pairs influences so that the material 203 functions as a lens due to the first pair 204 and as a lens for correcting aberration of the lens of the pair 204 due to the second pair 205. Therefore, the linearly polarized incident beam 201 receives the lens function from the material 203 when passing through the material and emits out of the material as an output beam 208.

The lens function of the lens 202 is further described in detail hereinafter with reference to FIGS. 18a and 18b.

Figure 18A:
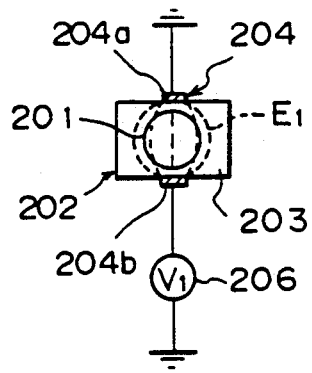
FIG. 18a is an explanatory view for explaining a state of electric field at a first sectional position in the electrooptic material of FIG. 17 when a voltage is applied to the material.

When the voltage $V_1$ is applied to the first pair 204, an electric field distribution is generated in the material 203 as illustrated by dashed lines $E_1$ in FIG. 18a. The distribution is such that the electric field is strong near the electrodes and weak around the center of the material 203.

Figure 18B:
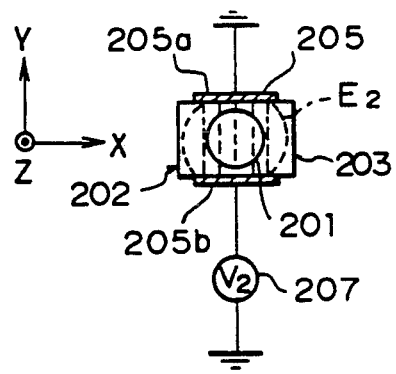
FIG. 18b is an explanatory view for explaining a state of electric field at a second sectional position in the electrooptic material of FIG. 17 when a voltage is applied to the material.

Similarly, when the voltage $V_2$ is applied to the second pair 205, an electric field distribution $E_2$ is generated in the material 203 as illustrated by dashed lines in FIG. 18b. The distribution is such that the electric field is strong around the electrodes and weak around the center of the material 203. The electric fields $E_1$ and $E_2$ are different since the widths $d_1$ and $d_2$ of the pairs 204 and 205 are different from each other.

In accordance with the above-mentioned electric field distribution, a refractive index distribution is generated in the PLZT crystal due to the electrooptic effect (secondary electrooptic effect). Under the assumption that the electric field direction and the linear polarization direction are the direction Y and that the direction of the incident beam 201 is the direction Z, the component $n_y$ of the refractive index in the Y-axis direction is represented by the following equation:

$$n_z = n_o(1 - n_o^2 R_{33} E_z^2 / 2) \quad (21)$$

wherein $n_o$ designates the refractive index of the electrooptic crystal of PLZT in the state that the electric field E is zero and $R_{33}$ designates the matrix component of the secondary electrooptic constant.

The refractive index change $\Delta n_y$ due to the electric field $E_z$ is derived from the equation (21) and is represented as follows;

$$\Delta n_y = -n_o^3 R_{33} E_y^2 / 2 \qquad (22)$$

As can be seen from the equation (22), the refractive index change $\Delta n_y$ is in proportion to the square of the electric field intensity.

The refractive index becomes low accordingly as the electric field becomes strong. Therefore, the refractive index distribution in the PLZT crystal becomes such that the refractive index is low near the electrodes while the refractive index is high around the center of the crystal. Accordingly, a lens effect in the direction Y is generated in the material 203 of the crystal toward the center thereof. The lens effect becomes large accordingly as the electrode length $l_1$ and $l_2$ is elongated.

Therefore, the beam 201 which is linearly polarized in the direction Y receives the lens function from the electrooptic lens 202 along the direction Y in the material 203 according to the voltage $V_1$ applied to the first electrode pair 204 comprising a pair of films 204a and 204b, each film having a size of width $d_1$ and length $l_1$.

The beam further receives the lens function in the direction Y from the second pair 205 having a pair of films 205a and 205b, each film having a size of width $d_2$ and length $l_2$. Due to the above-mentioned two stages of lens functions applied to the beam 208, the beam converges to a focal point at a focal length (f) from the lens 202.

The lens functions of the first pair 204 and the second pair 205 are different since the electrode widths thereof are different from each other. The lens function of the second pair 205 is to correct the spherical aberration of the lens function of the first pair 204.

Figure 19:
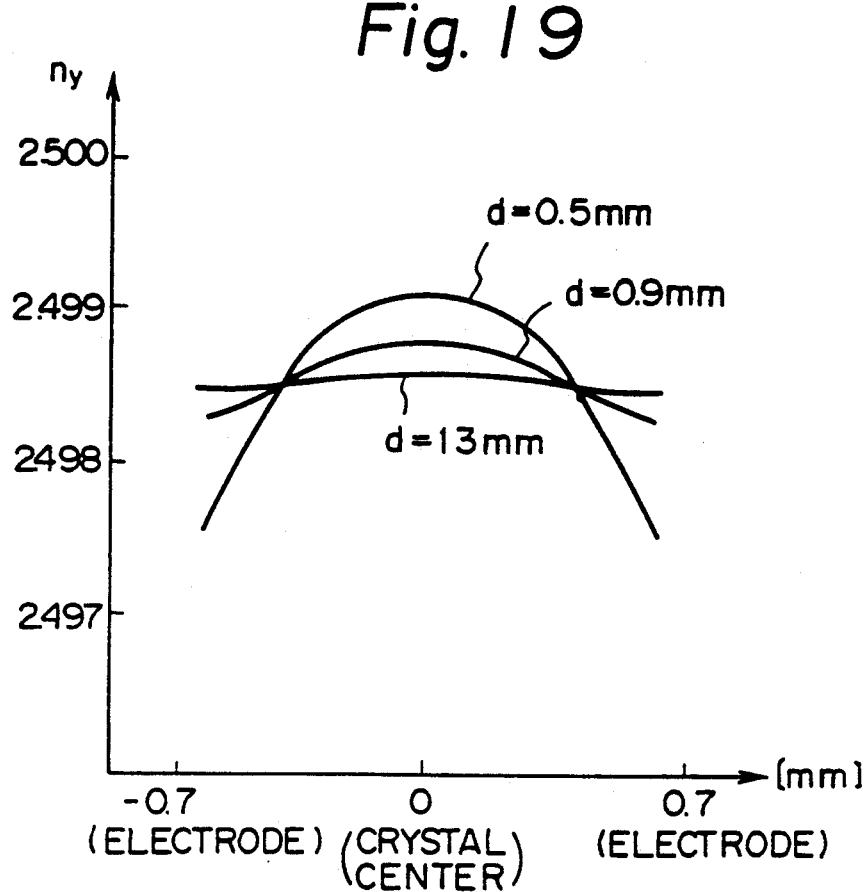
FIG. 19 is a graphical view of refractive index distribution of the electrooptic lens of the present invention in relation to the width of electrode on the lens.

FIG. 19 represents a refractive index distribution in the material 203 calculated and obtained by the finite element method analyzation with respect to three different electrode widths d of 0.5 mm, 0.9 mm and 1.3 mm of the electrode pair formed on the material 203. The distribution is in a sectional plane of the material 203 at the position X=0 wherein the origin of the coordinate is the center of the material 203 in FIG. 18b. The condition of the calculation is that $n_o = 2.5$ and the electric field intensity $E_2 = 700$ V/mm.

In accordance with the analyzation result represented by the graph of FIG. 19, the refractive index distribution becomes flattened accordingly as the electrode width is widened.

Also, in accordance with a simulation of beam trace on the basis of the above-mentioned refractive index distribution, the spherical aberration of the beam is analyzed such that the longitudinal aberration of the beam functioned by a narrow electrode (for example d=0.5 mm) is reversed in sign from that of the beam functioned by a wide electrode (for example d=1.3 mm), that is, one is negative while the other is positive. Therefore, it becomes possible to minimize the spherical aberration by combining the narrow electrode lens and the wide electrode lens as is the case of the above-mentioned embodiment of the present invention wherein the first electrode pair 204 is combined with the second electrode pair 205.

Figure 20:
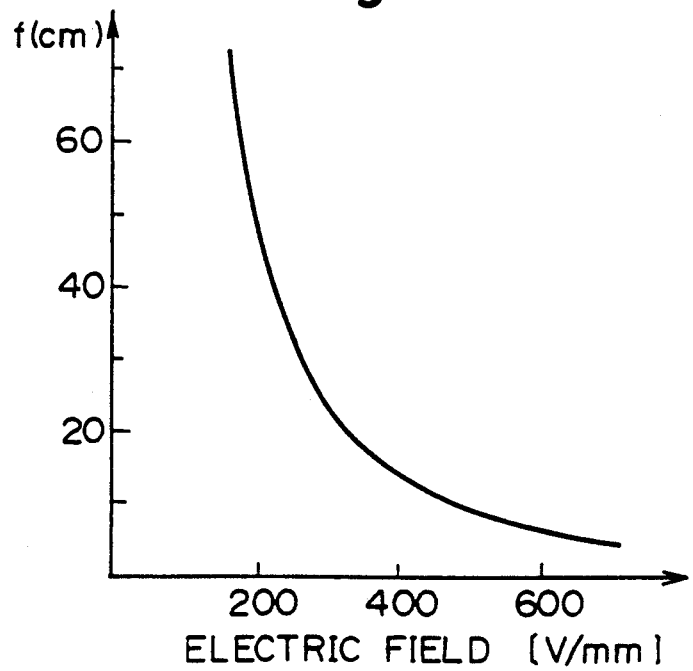
FIG. 20 is a graphical view of focal length characteristic of the electrooptic lens of the present invention in relation to strength of electric fields applied to the lens.

FIG. 20 represents a graph of actual measurement result of focal length in relation to electric field intensity with respect to an electrooptic lens having only one pair of electrodes. The electrode size of the measured lens is such that the width d=0.5 mm and the length l=8 mm. In accordance with the result of this measurement, the focal length (f) becomes short in inverse proportion to the square of the electric field intensity.

Figure 21:
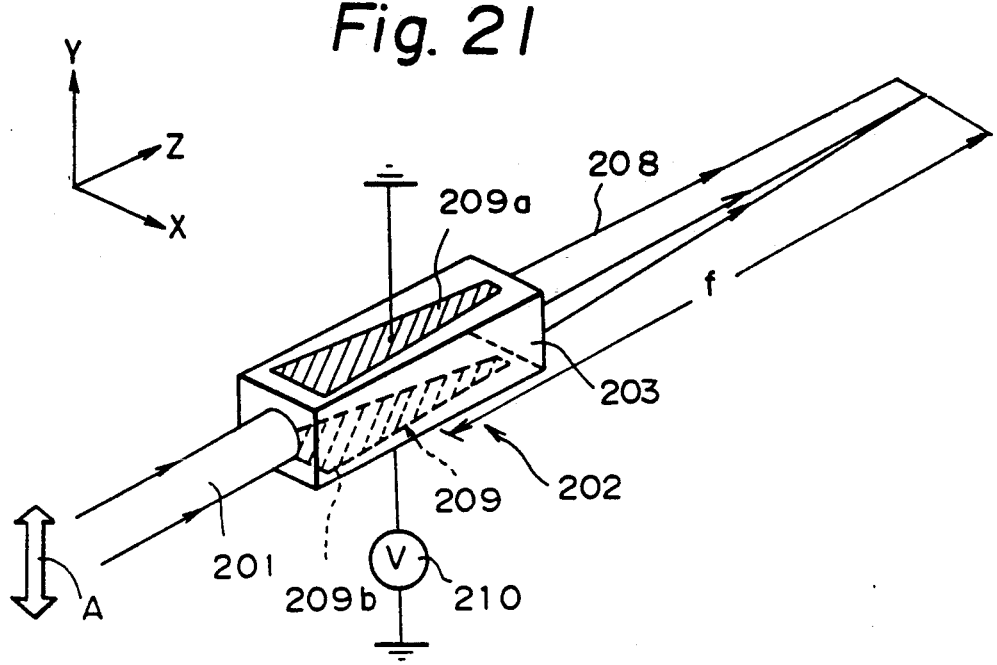
FIG. 21 is a perspective view of an optical system in accordance with a still further embodiment of the present invention.

A still further embodiment of the present invention is described hereinafter with respect to FIG. 21.

This embodiment comprises an electrode pair 209 comprising a pair of electrode films 209a and 209b formed on an electrooptic material 203. Each of the films 209a and 209b has a longitudinal trapozoid shape, the width of which is continuously decreased from the input side to the output side of the material 203 along the direction of the optical axis (direction z). Due to this particular shape, the electrode pair 209 functions not only to converge the beam passing through the material 203 but also to correct the spherical aberration of the beam. Therefore, only the pair 209 is formed on the material 203 and only one power source 210 is provided to apply a voltage V to the pair 209.

By such an arrangement of only one pair 209 formed on the material 203, it becomes possible to simplify the structure of the device.

It is to be noted that, by appropriately changing the shape of the electrode films 209a and 209b along the direction of the optical axis, it becomes possible to obtain the two functions, that is, the lens function and the aberration correction function, from one pair of the films 209a and 209b.

Figure 22:
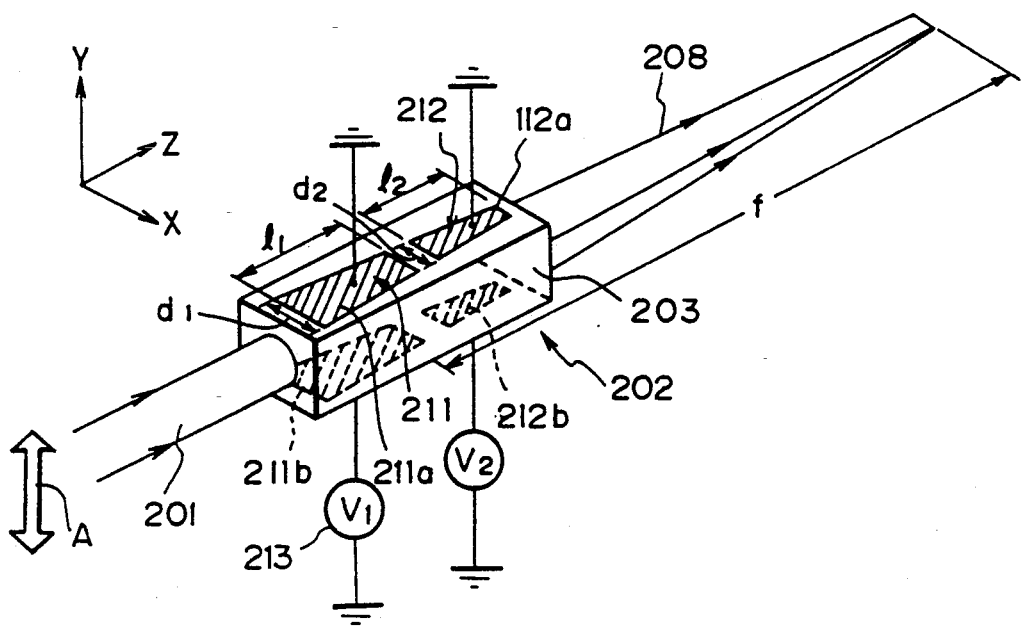
FIG. 22 is a perspective view of an optical system in accordance with a still further embodiment of the present invention.

A still further embodiment of the present invention is described hereinafter with reference to FIG. 22. In this embodiment of the optical device, the electrode pair 209 of the above-mentioned embodiment of FIG. 21 is divided into two parts, namely, a first electrode pair 211 and a second electrode pair 212. The pair 211 comprises a pair of electrode films 211a and 211b between which a first power source 213 of voltage $V_1$ is connected. Also, the pair 212 comprises a pair of electrode films 212a and 212b between which a second power source 214 of voltage $V_2$ is connected.

In accordance with the arrangement mentioned above, it becomes possible to obtain the lens function and the aberration correction function wherein the two functions are independently controlled by adjusting the voltages $V_1$ and $V_2$, respectively, and appropriately arranging the lengths $l_1$ and $l_2$ and the widths $d_1$ and $d_2$ of the films 211a and 211b, respectively. Therefore, it becomes possible to further decrease the spherical aberration.

A still further embodiment of the present invention is described hereinafter with reference to FIGS. 23 to 27. This embodiment of the optical device has a convergent lens function in the direction X instead of the direction Y as is the case of the preceding embodiments.

A first electrode pair 215 and a second electrode pair 216 are formed on an upper surface and a lower surface of an electrooptic material 203 with respect to the direction Y. The pair 215 is disposed in the input side of the material 203 and the pair 216 is disposed in the output side of the material 203. The pair 215 comprises two pairs of electrode films $215a_1$, $215b_1$; $215a_2$, $215b_2$ each of which has a strip shape of length l. The films are disposed in parallel to each other along the direction Z on each surface of the material 203 forming a gap (g) therebetween in the direction X. A first power source 217 is connected to the pair 215 to supply a voltage $V_1$ between the films of the pair 215.

The second pair 216 comprises two pairs of electrode films $216a_1$, $216b_1$; $216a_2$, $216b_2$ each of which has a strip shape having a concave longitudinal side. The films are disposed in parallel to each other along the direction X on each surface of the material 203 forming a gap therebetween in the direction Z, the concave sides thereof being faced to each other. A second power source 218 is connected to the pair 216 to supply a voltage $V_2$ between the films of the pair 216.

The optical device having the structure mentioned above functions as follows.

Figure 24:
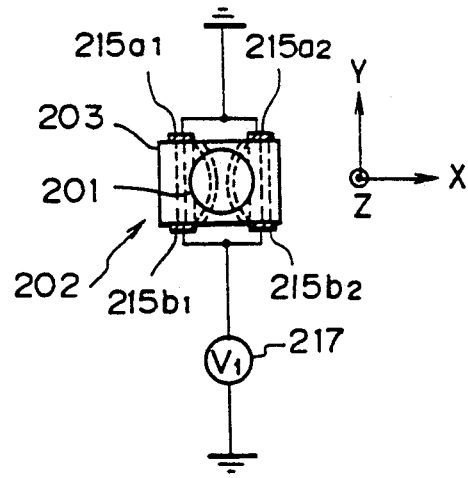
FIG. 24 is an explanatory view for explaining a state of electric field of the electrooptic lens of FIG. 23 when a voltage is applied to the lens and representing a sectional view of the lens.

An optical beam 201 incident upon the material 203 is linearly polarized in the direction Y in advance. The beam 201 receives a lens function in the direction X from the material 203 due to the voltage $V_1$ which is applied to the pair 215. More precisely, when the voltage $V_1$ is applied to the pair 215, an electric field distribution is generated in the material 203 in accordance with the shape and the layout of the electrode, as illustrated in FIG. 24 by dashed lines. As a result, the refractive index distribution in the material 203 becomes such that the refractive index is high at the position $X=0$ in the X-Y plane due to the electrooptic effect of the PLZT crystal wherein the origin of the coordinates is the center of the material 203 illustrated in FIG. 24.

Figure 26:
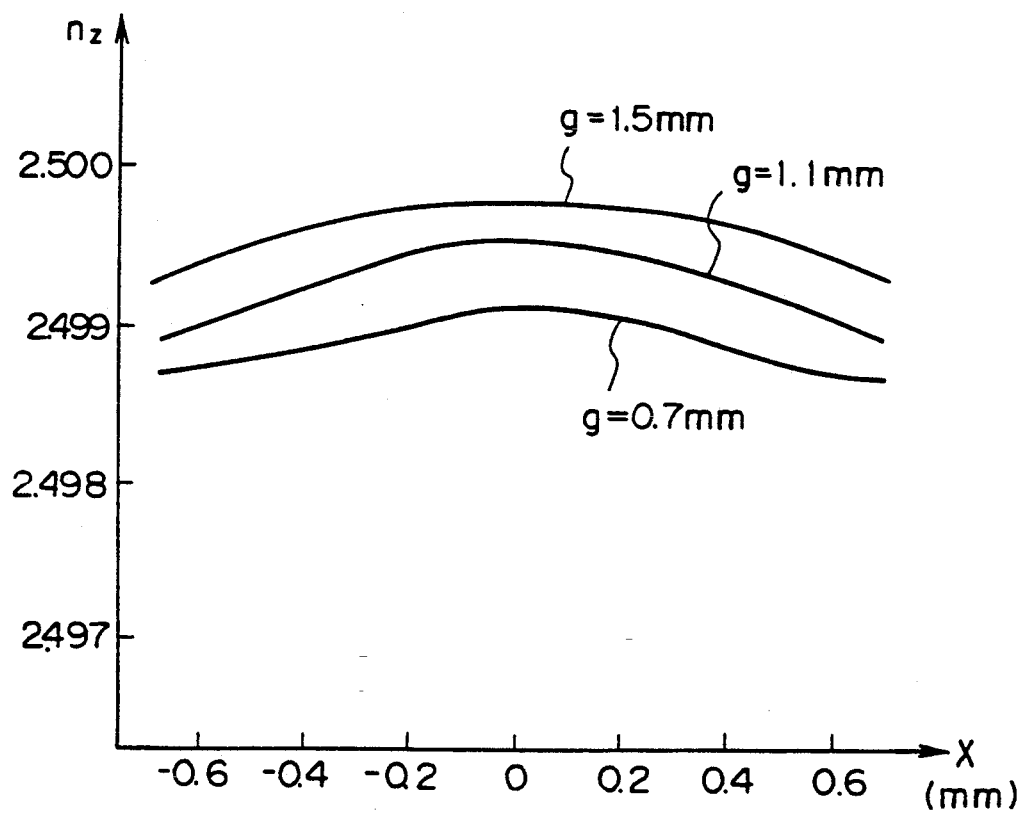
FIG. 26 is a graphical view of refractive index distribution characteristic of the electrooptic lens of the present invention in relation to the gap between the electrodes of the present invention.

FIG. 26 is a graphical view of result of a calculation for analyzing the refractive index distribution conducted by the finite-element method in the electrooptic crystal when the gap between the electrode films of the first pair 215 is changed. The graph represents the distribution at the position $Y=0$ along the X-axis wherein the origin of the coordinates is the center of the crystal in FIG. 24. The calculation is conducted under the condition that $n_o = 2.5$, the electric field intensity $E_2 = 700$ V/mm and the gap $g = 1.5$ mm, 1.1 mm and 0.7 mm, respectively.

As can be seen from the graph, the refractive index distribution curve does not change much if the gap is changed. However, the curve line is shifted approximately in parallel so that the value of the refractive index changes.

Figure 27A:
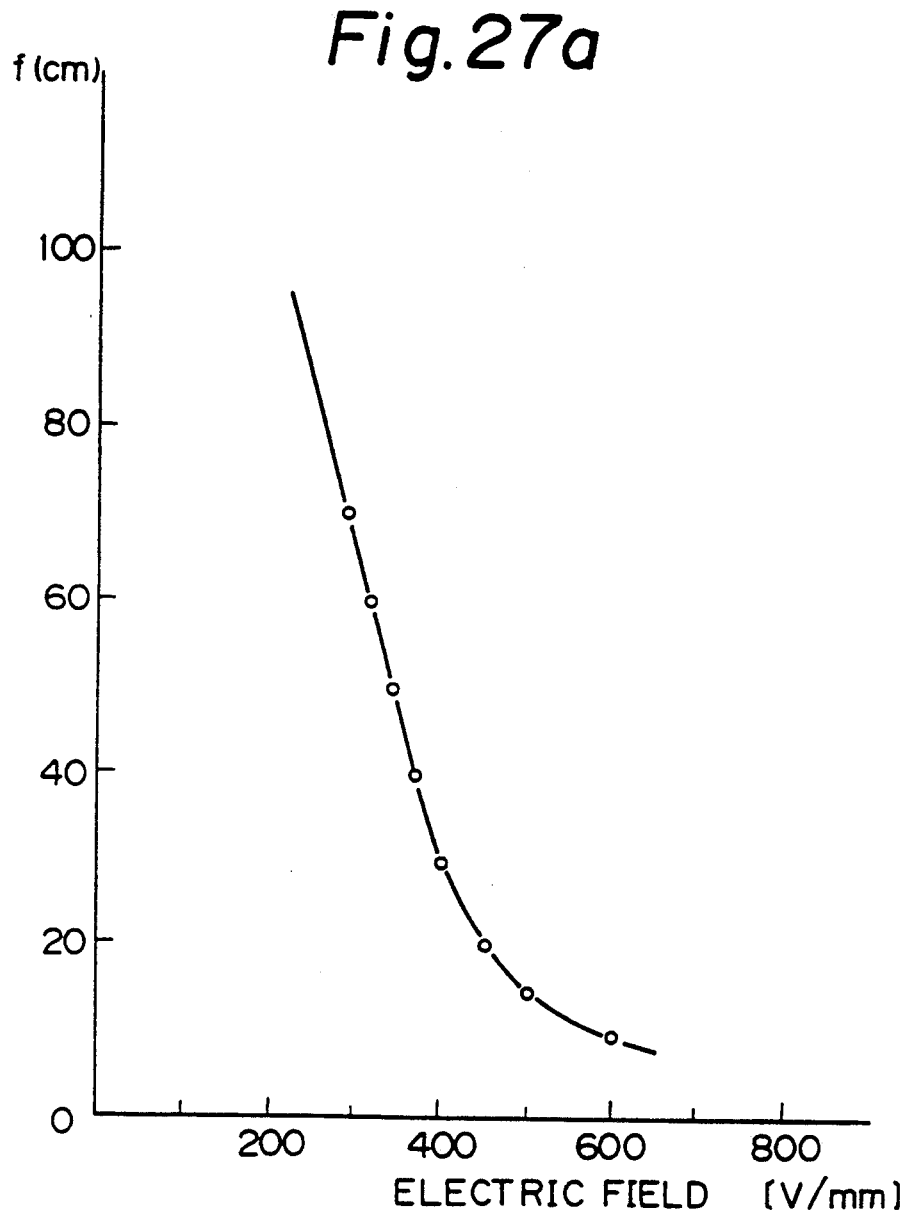
FIG. 27a is a graphical view of focal length characteristic of the electrooptic lens of the present invention in relation to strength of electric field.
Figure 27B:
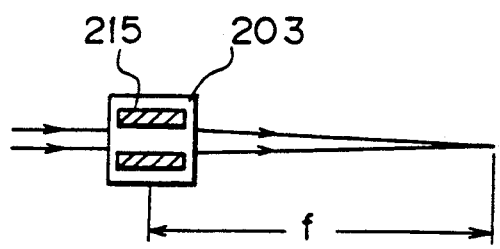
FIG. 27b is an explanatory view for explaining a condition under which the characteristic curve of FIG. 27a is obtained.

FIG. 27a is a graphical view of result of an actual measurement of the focal length (f) in relation to the electric field intensity for the electrooptic lens having only the first electrode pair 215 formed on the electrooptic crystal 203 for functioning to converge the beam in the direction X, as illustrated in FIG. 27b. The size of the electrode pair is such that the gap (g) between the films is 1.5 mm and the length l of each film is 8 mm.

As mentioned above, the beam receives the convergent lens function from the first electrode pair 215. The beam then receives an aberration correction function from the second pair 216 to which the voltage $V_2$ is applied by being converged or diverged when passing through the material 203 around the pair 216 so that the beam converges to the point at a focal distance (f) from the lens.

Figure 25:
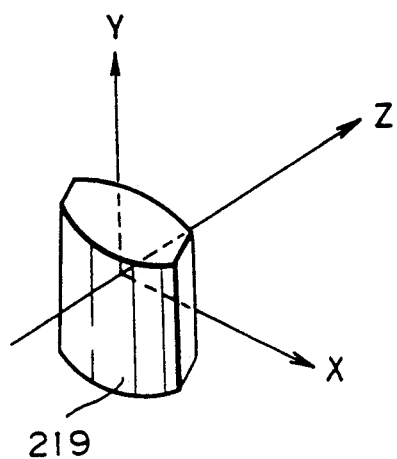
FIG. 25 is a perspective view of an optical lens.

More precisely, when the voltage $V_2$ is applied to the pair 216, the portion of the material 203 around the pair 216 becomes equivalent to an optical cylindrical lens 219 as illustrated in FIG. 25. Therefore, by adjusting the curvature of the concave side edge of the electrode film of the second pair 216, it becomes possible to obtain a lens function to decrease and correct the spherical aberration which is generated by the lens function of the first pair 215.

Figure 28:
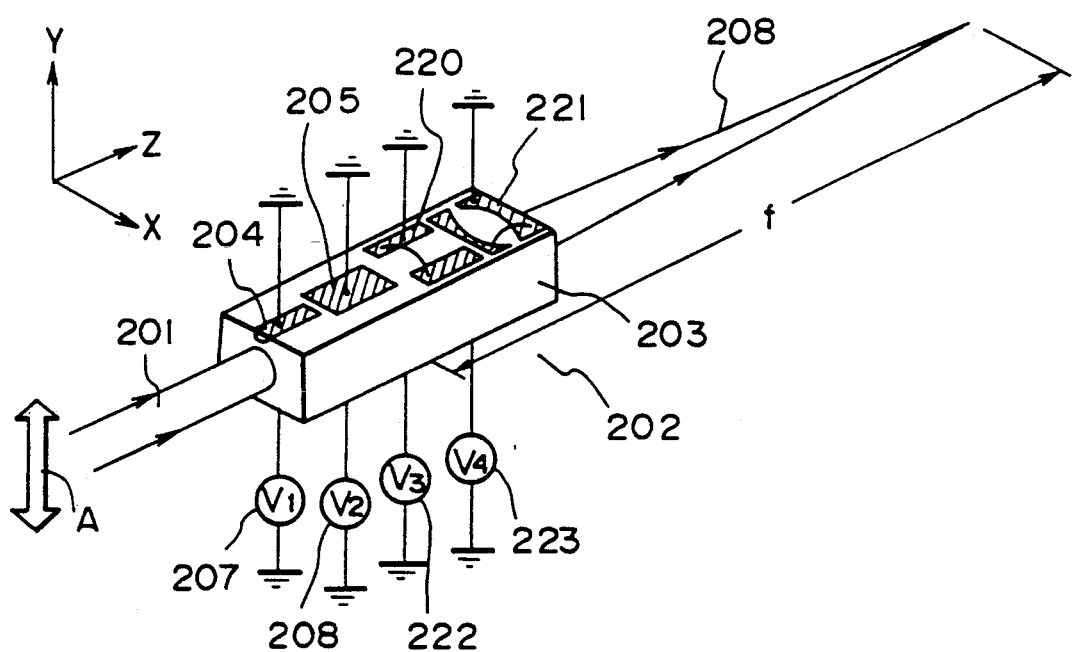
FIG. 28 is a perspective view of an optical system in accordance with a still further embodiment of the present invention.

A still further embodiment of the present invention is described hereinafter with reference to FIG. 28.

Figure 23:
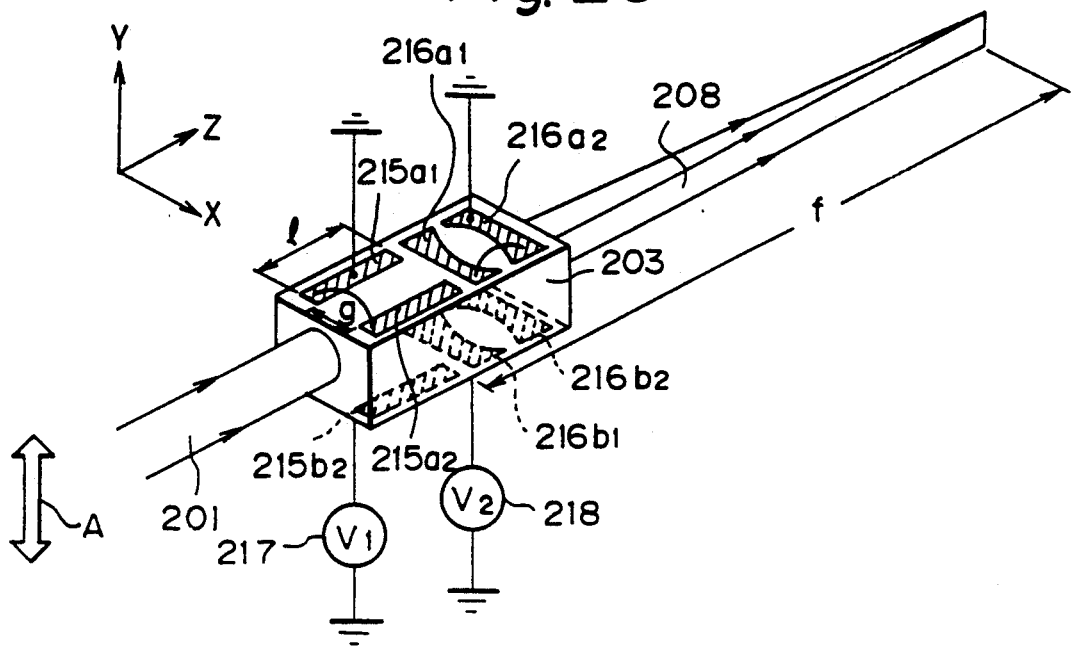
FIG. 23 is a perspective view of an optical system in accordance with a still further embodiment of the present invention.

This embodiment of the optical device is a combination of the embodiments of FIGS. 17 and 23 mentioned above. An electrooptic lens 202 comprises an electrooptic material 203 on which electrode pairs 204, 205, 220 and 221 are disposed along the direction of an optical axis of an incident beam 201 in this order. The pairs 204 and 205 correspond to the pairs of the same numerals of the embodiment of FIG. 17. Power sources 207 and 208 of voltages $V_1$ and $V_2$ are connected to the pairs 204 and 205, respectively. The pairs 220 and 221 correspond to the pairs of the same numerals of the embodiment of FIG. 23. Power sources 222 and 223 of voltages $V_3$ and $V_4$ are connected to the pairs 220 and 221, respectively. The pairs 204 and 205 have a lens function in the direction Y, as mentioned before. Also, the pairs 220 and 221 have a lens function in the direction X, as mentioned before.

In accordance with the structure of the embodiment mentioned above, the device has the convergent lens functions in both the direction X and the direction Y and also has the spherical aberration correcting functions in the directions of X and Y, respectively.

The function of the embodiment is described in detail below.

The incident beam 201 which is linearly polarized in the direction Y receives the lens function from the pair 204 so that the beam is converged in the direction Y. The degree of the convergent lens function depends upon the voltage $V_1$ applied to the pair 204 and the electrode size (width $d_1$ and length $l_1$) so that the convergent effect is enhanced according as $V_1$ and $l_1$ become large and $d_1$ becomes small.

After that, the convergent beam is functioned by the pair 205 to which the voltage $V_2$ is applied so that the aberration of the beam is corrected in the direction Y.

After that, the beam receives the convergent lens function from the pair 220 in the direction X. The degree of this convergent lens function depends upon the voltage $V_3$ applied to the pair 220, the electrode length $l_3$ and the gap (g) between the electrodes so that the convergent effect is enhanced accordingly as $V_3$ and $l_3$ become large and (g) becomes small.

After that, the convergent beam is operated on by the pair 221 to which the voltage $V_4$ is applied so that the aberration of the beam is corrected in the direction X. This lens function for correcting the aberration can be controlled by adjusting the voltage $V_4$ and setting an appropriate shape of the electrode.

It is to be noted that it is possible to coincide the convergent points in the directions X and Y with each other by controlling the voltages $V_1$ and $V_3$ or adjusting the shape of the electrodes when the voltages are the same together.

Many widely different embodiments of the present invention may be constructed without departing from the spirit and scope of the present invention. It should be understood that the present invention is not limited to the specific embodiments described in the specification, except as defined in the appended claims.

What is claimed is:

1. An electrooptic device comprising:
   an electrooptic material having a parallelpiped shape and disposed on an optical axis of a linearly polarized optical beam polarizing in a predetermined direction for permitting said optical beam to pass therethrough;

an electrode means disposed on said electrooptic material for performing a first lens function which converges said optical beam in one of said predetermined direction and a direction perpendicular to said predetermined direction and said optical axis at a portion of said electrode means situated on an incident side of said optical beam, for performing a second lens function which converges said converged optical beam in the other of said predetermined direction and said perpendicular direction at a middle portion of said electrode means, and for performing a deflection function which deflects said optical beam converged by said second lens function toward said perpendicular direction at a portion of said electrode means situated on an exit side of said optical beam; and a power source means electrically connected to said electrode means for applying a voltage to said electrode means.

2. An electrooptic device according to claim 1, in which said electrooptic material has two surfaces which face each other on both sides of said optical axis and which extend along said optical axis, said two surfaces perpendicularly crossing said predetermined direction, said electrode means comprises a pair of first electrodes, a pair of second electrodes, a pair of third electrodes and a pair of fourth electrodes, said first electrodes being disposed respectively on said two surfaces at a portion of said electrooptic material situated on an incident side of said optical beam in such a manner as to be opposite to each other, each of said first electrodes having a shape of a longitudinal strip extending along said optical axis, said first electrodes performing said first lens function which converges said optical beam in said predetermined direction upon application of a voltage between said first electrodes, said second electrodes being disposed respectively on said two surfaces at a middle portion of said electrooptic material in such a manner as to be opposite to each other, each of said second electrodes having a shape of a longitudinal strip extending along said optical axis, said third electrodes being disposed respectively on said two surfaces at said middle portion of said electrooptic material in such a manner as to be opposite to each other and offset on one side of a perpendicular direction to said optical axis with respect to said second electrodes, each of said third electrodes having a shape of a longitudinal strip extending along said optical axis, said second electrodes and said third electrodes performing said second lens function which converges said optical beam, converged by said first electrodes, in said perpendicular direction upon application of a voltage between one of said second electrodes and one of said third electrodes and the other of said second electrodes and the other of said third electrodes, said one of said second electrodes and said one of said third electrodes being placed on one of said two surfaces, said other of said second electrodes and said other of said third electrodes being placed on the other of said two surfaces, said fourth electrodes being disposed respectively on said two surfaces at a portion of said electrooptic material situated on an exit side of said optical beam in such a manner as to be opposite to each other, each of said fourth electrodes having a shape of a right angled triangle and being arranged such that a base of said right angled triangle is situated on a side edge of said electrooptic material situated on an exit side of said optical beam, said fourth electrodes performing said deflection function upon application of a voltage between said fourth electrodes.

3. An electrooptic device according to claim 1, in which said electrooptic material has two surfaces which face each other on both sides of said optical axis and which extend along said optical axis, said two surfaces perpendicularly crossing said predetermined direction, said electrode means comprises a pair of first electrodes, a pair of second electrodes and a pair of third electrodes, said first electrodes being disposed respectively on said two surfaces at a portion of said electrooptic material situated on an incident side of said optical beam in such a manner as to be opposite to each other, each of said first electrodes having a rectangular shape from which two semicircles are removed from opposite side edge portion such that a narrowest portion thereof is arranged on said optical axis, said first electrodes performing said first lens function which converges said optical beam in said perpendicular direction upon application of a voltage between said first electrodes, said second electrodes being disposed respectively on said two surfaces at a middle portion of said electrooptic material in such a manner as to be opposite to each other, each of said second electrodes having a shape of a longitudinal strip extending along said optical axis, said second electrodes performing said second lens function which converges said optical beam, converged by said first electrodes, in said predetermined direction upon application of a voltage between said second electrodes, said third electrodes being disposed respectively on said two surfaces at a portion of said electrooptic material situated on an exit side of said optical beam in such a manner as to be opposite to each other, each of said third electrodes having a shape of a right angled triangle and being arranged such that a base of said right angled triangle is situated on a side edge of said electrooptic material situated on an exit side of said optical beam, said third electrodes performing said deflection function upon application of a voltage between said third electrodes.

4. An electrooptic device comprising:

a first converging means disposed on an optical axis of a linearly polarized optical beam polarizing in a predetermined direction for converging said optical beam in a direction perpendicular to said predetermined direction and said optical axis to thereby produce an optical beam flattened in said predetermined direction;

a first electrooptic lens disposed on said optical axis in a focal position of said first converging means for converging said flattened optical beam in said predetermined direction;

a second converging means disposed on said optical axis such that said first electrooptic lens is positioned in a focal position of said second converging means, for converging an optical beam exited from said first electrooptic lens in said perpendicular direction;

a third converging means disposed on said optical axis for converging an optical beam exited from said second converging means in said predetermined direction to thereby produce an optical beam flattened in said perpendicular direction;

a second electrooptic lens disposed on said optical axis in a focal position of said third converging means for converging said flattened optical beam from said third converging means in said perpendicular direction and for deflecting said converged optical beam in said perpendicular direction; and a fourth converging means disposed on said optical axis such that second electrooptic lens is positioned in a focal position of said fourth converging means, for converging an optical beam exited from said second electrooptic lens in said predetermined direction.

5. An electrooptic device according to claim 4, in which said first converging means and said second converging means comprise a first cylindrical lens and a second cylindrical lens, respectively, said first electrooptic lens comprises: an electrooptic material disposed on said optical axis and having two surfaces which face each other on both sides of said optical axis and which extend along said optical axis, said two surfaces perpendicularly crossing said predetermined direction; a pair of electrodes disposed respectively on said two surfaces in such a manner as to be opposite to each other, each of said electrodes having a shape of a longitudinal strip extending along said optical axis, said electrodes converging said flattened optical beam from said first cylindrical lens in said predetermined direction upon application of a voltage therebetween; and a power source electrically connected to a pair of said electrodes for applying a voltage between said electrodes, said third converging means and said fourth converging means comprise a third cylindrical lens and a fourth cylindrical lens, respectively, said second electrooptic lens comprises: another electrooptic material disposed on said optical axis and having two surfaces which face each other on both sides of said optical axis and which extend along said optical axis, said two surfaces perpendicularly crossing said predetermined direction;

a pair of first electrodes disposed respectively on said two surfaces at a position of said another electrooptic material situated on an incident side of said optical beam in such a manner as to be opposite to each other, each of said first electrodes having a shape of a longitudinal strip extending along said optical axis;

a pair of second electrodes disposed respectively on said two surfaces at said portion of said another electrooptic material situated on said incident side of said optical beam in such a manner as to be opposite to each other and offset on one side of a perpendicular direction to said optical axis with respect to said first electrodes, each of said second electrodes having a shape of a longitudinal strip extending along said optical axis, said first electrodes and said second electrodes converging said flattened optical beam from said third cylindrical lens in said perpendicular direction upon application of a voltage between one of said first electrodes and one of said second electrodes and the other of said first electrodes and the other of said second electrodes, said one of said first electrodes and said one of said second electrodes being placed on one of said two surfaces, said other of said first electrodes and said other of said second electrodes being placed on the other of said two surfaces;

a first power source electrically connected to a pair of said first electrodes and a pair of said second electrodes for applying said voltage;

a pair of third electrodes disposed respectively on said two surfaces at a position of said another electrooptic material situated on an exit side of said optical beam in such a manner as to be opposite to each other, each of said third electrodes having a shape of a right angled triangle and being arranged such that a base of said right angled triangle is situated on a side edge of said another electrooptic material situated on an exit side of said optical beam, said third electrodes deflecting said optical beam, converged by said first and second electrodes, in said perpendicular direction upon application of a voltage between said third electrodes; and a second power source electrically connected to a pair of said third electrodes for applying a voltage between said third electrodes.

* * * * *